United States Patent
Yasuda

(10) Patent No.: US 12,136,696 B2
(45) Date of Patent: Nov. 5, 2024

(54) SOLID ELECTROLYTE COMPOSITION, SHEET FOR ALL-SOLID STATE SECONDARY BATTERY, ELECTRODE SHEET FOR ALL-SOLID STATE SECONDARY BATTERY, ALL-SOLID STATE SECONDARY BATTERY, METHOD OF MANUFACTURING SHEET FOR ALL-SOLID STATE SECONDARY BATTERY, AND METHOD OF MANUFACTURING ALL-SOLID STATE SECONDARY BATTERY

(71) Applicant: FUJIFILM Corporation, Tokyo (JP)

(72) Inventor: Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 827 days.

(21) Appl. No.: 17/170,768

(22) Filed: Feb. 8, 2021

(65) Prior Publication Data

US 2021/0320322 A1 Oct. 14, 2021

Related U.S. Application Data

(63) Continuation of application No. PCT/JP2019/037483, filed on Sep. 25, 2019.

(30) Foreign Application Priority Data

Sep. 27, 2018 (JP) ................................. 2018-182796

(51) Int. Cl.
*H01M 10/0562* (2010.01)
*H01M 4/62* (2006.01)
*H01M 10/0525* (2010.01)

(52) U.S. Cl.
CPC ....... *H01M 10/0562* (2013.01); *H01M 4/622* (2013.01); *H01M 4/623* (2013.01);
(Continued)

(58) Field of Classification Search
CPC .. H01M 10/0562; H01M 4/622; H01M 4/623; H01M 10/0525; H01M 2300/0068; H01M 2300/0091
See application file for complete search history.

(56) References Cited

U.S. PATENT DOCUMENTS

2016/0204465 A1 7/2016 Mimura et al.
2016/0336613 A1* 11/2016 Mochizuki et al. ......................... H01M 10/056
(Continued)

FOREIGN PATENT DOCUMENTS

JP 2015088486 5/2015
WO 2016017759 2/2016
(Continued)

OTHER PUBLICATIONS

Makino, WO2016136089 A1, EPO machine translation, 2016 (Year: 2016).*

(Continued)

*Primary Examiner* — Haroon S. Sheikh
*Assistant Examiner* — Kan Luo
(74) *Attorney, Agent, or Firm* — JCIPRNET

(57) ABSTRACT

Provided is a solid electrolyte composition including: an inorganic solid electrolyte having ion conductivity of a metal belonging to Group 1 or Group 2 in the periodic table; and a polymer represented by a specific formula. Provided are also a sheet for an all-solid state secondary battery, an electrode sheet for an all-solid state secondary battery, and an all-solid state secondary battery that are formed of the solid electrolyte composition, a sheet for an all-solid state secondary battery, and a method of manufacturing an all-solid state secondary battery.

13 Claims, 1 Drawing Sheet

(52) U.S. Cl.
CPC .................. *H01M 10/0525* (2013.01); *H01M 2300/0068* (2013.01); *H01M 2300/0091* (2013.01)

(56) References Cited

U.S. PATENT DOCUMENTS

| | | | |
|---|---|---|---|
| 2017/0133717 A1* | 5/2017 | Makino et al. ... | H01M 10/0585 |
| 2017/0301950 A1* | 10/2017 | Mimura et al. ... | H01M 10/0562 |
| 2017/0352917 A1 | 12/2017 | Makino et al. | |
| 2018/0076478 A1 | 3/2018 | Mimura et al. | |

FOREIGN PATENT DOCUMENTS

| | | |
|---|---|---|
| WO | 2016136089 | 9/2016 |
| WO | 2016199723 | 12/2016 |

OTHER PUBLICATIONS

"International Search Report (Form PCT/ISA/210) of PCT/JP2019/037483," mailed on Nov. 26, 2019, with English translation thereof, pp. 1-5.

"Written Opinion of the International Searching Authority (Form PCT/ISA/237) of PCT/JP2019/037483," mailed on Nov. 26, 2019, with English translation thereof, pp. 1-6.

\* cited by examiner

SOLID ELECTROLYTE COMPOSITION, SHEET FOR ALL-SOLID STATE SECONDARY BATTERY, ELECTRODE SHEET FOR ALL-SOLID STATE SECONDARY BATTERY, ALL-SOLID STATE SECONDARY BATTERY, METHOD OF MANUFACTURING SHEET FOR ALL-SOLID STATE SECONDARY BATTERY, AND METHOD OF MANUFACTURING ALL-SOLID STATE SECONDARY BATTERY

CROSS-REFERENCE TO RELATED APPLICATIONS

This application is a Continuation of PCT International Application No. PCT/JP2019/037483 filed on Sep. 25, 2019, which claims priority under 35 U.S.C. § 119 (a) to Japanese Patent Application No. 2018-182796 filed in Japan on Sep. 27, 2018. Each of the above applications is hereby expressly incorporated by reference, in its entirety, into the present application.

BACKGROUND OF THE INVENTION

1. Field of the Invention

The present invention relates to a solid electrolyte composition, a sheet for an all-solid state secondary battery, an electrode sheet for an all-solid state secondary battery, an all-solid state secondary battery, a method of manufacturing a sheet for an all-solid state secondary battery, and a method of manufacturing an all-solid state secondary battery.

2. Description of the Background Art

In an all-solid state secondary battery, a negative electrode, an electrolyte, and a positive electrode are all solid, and safety or reliability which is considered an issue of batteries including an organic electrolytic solution can be significantly improved. In addition, the service lives can also be extended. Further, an all-solid state secondary battery may have a structure in which electrodes and an electrolyte are directly disposed in series. Therefore, the energy density can be further increased as compared to a secondary battery in which an organic electrolytic solution is used, and the application to an electric vehicle or a large-sized storage battery is expected.

A configuration is disclosed in which, in the all-solid state secondary battery, any one of constituent layers (for example, an inorganic solid electrolyte layer, a negative electrode active material layer, and a positive electrode active material layer) is formed of a material including an inorganic solid electrolyte or an active material and binder particles (binder) such as a specific polymer compound. For example, WO2016/136089A describes a solid electrolyte composition including: an inorganic solid electrolyte; and a compound represented by a specific formula that includes a group having a hydrocarbon group with 8 or more carbon atoms. In addition, JP2015-088486A describes a solid electrolyte composition including: binder particles having an average particle size of 10 nm to 1,000 nm that is formed of a polymer incorporated with a macromonomer having a number-average molecular weight of 1,000 or higher as a side chain component; an inorganic solid electrolyte; and a dispersion medium.

SUMMARY OF THE INVENTION

In a case where a constituent layer of an all-solid state secondary battery is formed using solid particles (for example, an inorganic solid electrolyte, solid particles, or a conductive auxiliary agent), it is desirable that a material for forming a constituent layer exhibits excellent dispersibility by dispersing solid particles in a dispersion medium or the like. However, even in a case where a material having excellent dispersibility is used, in general, in a constituent layer that is formed of solid particles, the interface contact state between the solid particles is low, and the interface resistance tends to increase. Further, in a case where binding properties of a binder between the solid particles are weak, poor contact between the solid particles occurs. Further, poor contact or the like between the active material layer and the solid electrolyte layer occurs due to expansion and contraction of an active material during charging and discharging. Further, in a case where binding properties between the solid particles and a current collector are weak, poor contact between the active material layer and the current collector also occurs. In a case where the poor contact occurs, the resistance of the all-solid state secondary battery increases (the battery performance decreases).

Incidentally, recently the performance of an electric vehicle has increased, and research and development for practical use or the like has rapidly progressed. Therefore, battery performance required for the all-solid state secondary battery has increased. Thus, binding properties between the solid particles and binding properties between the current collector and the solid particle (hereinafter, collectively referred to as "binding properties between solid particles") are required to be improved for the all-solid state secondary battery to exhibit a high battery performance.

An object of the present invention is to provide a solid electrolyte composition having excellent dispersibility that can improve binding properties between solid particles to impart a high battery performance to an all-solid state secondary battery in case of being used as a material forming a constituent layer of the all-solid state secondary battery. In addition, another object of the present invention is to provide a sheet for an all-solid state secondary battery, an electrode sheet for an all-solid state secondary battery, and an all-solid state secondary battery that are formed of the solid electrolyte composition, a method of manufacturing a sheet for an all-solid state secondary battery, and a method of manufacturing an all-solid state secondary battery.

The present inventors repeatedly conducted a thorough investigation and found that, by using a binder including a specific branched polymer in combination with an inorganic solid electrolyte, the inorganic solid electrolyte can be highly dispersed, and a solid electrolyte composition having excellent dispersibility can be prepared, the specific branched polymer including: a polymer chain that includes a component having at least one selected from a fluoroalkylene group or a siloxane structure; and a partial structure that has a group having adsorption to solid particles. Further, it was found that, with this solid electrolyte composition, a constituent layer can be formed in which other solid particles including an inorganic solid electrolyte strongly bind to each other and, in a case where an active material layer is formed, solid electrolyte composition particles and a current collector strongly bind to each other. In addition, the present inventors found that, by using the solid electrolyte composition as a constituent material for forming a sheet for an all-solid state secondary battery, an electrode sheet for an all-solid state secondary battery, or a constituent layer in an all-solid state secondary battery, an excellent battery performance can be imparted to the all-solid state secondary battery. The present invention has been completed based on the above findings as a result of repeated investigation.

That is, the above-described objects have been achieved by the following means.

<1> A solid electrolyte composition comprising:
an inorganic solid electrolyte having ion conductivity of a metal belonging to Group 1 or Group 2 in the periodic table; and
a polymer represented by Formula 1,

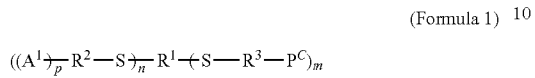

(Formula 1)

in the formula, $R^1$ represents an (m+n)-valent linking group,
$A^1$ represents an acidic group, a group having a basic nitrogen atom, a urea group, a urethane group, an alkoxysilyl group, an epoxy group, an isocyanate group, or a hydroxyl group, p represents an integer of 1 to 10,
$R^2$ and $R^3$ represent a single bond or a linking group,
$P^C$ represents a polymer chain that includes a component having at least one selected from a fluoroalkylene group or a siloxane structure,
m represents an integer of 1 to 8,
n represents an integer of 2 to 9, and
m+n represents an integer of 3 to 10.

<2> The solid electrolyte composition according to <1>,
in which the component including at least one selected from a fluoroalkylene group or a siloxane structure is a component derived from a polymerizable compound having one or more ethylenically unsaturated group.

<3> The solid electrolyte composition according to <1> or <2>,
in which the component including at least one selected from a fluoroalkylene group or a siloxane structure is a component represented by Formula (3) or Formula (4),

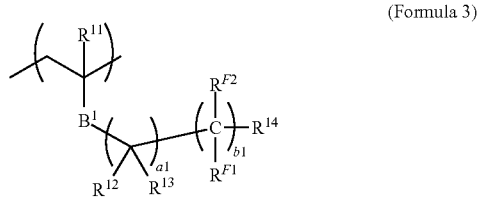

(Formula 3)

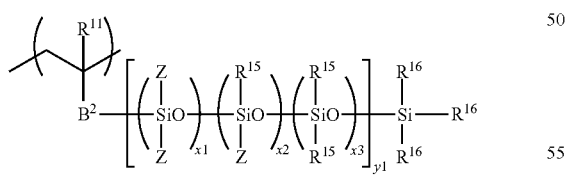

(Formula 4)

in Formula (3), $R^{11}$ represents a hydrogen atom or methyl,
$B^1$ represents a single bond or a linking group,
$R^{12}$ and $R^{13}$ represent a hydrogen atom, a hydroxy group, or an alkyl group having 1 to 4 carbon atoms,
$R^{14}$ represents a hydrogen atom or a fluorine atom,
$R^{F1}$ and $R^{F2}$ represent a fluorine atom or a fluoroalkyl group having 1 to 4 carbon atoms,
a1 represents an integer of 0 or more,
b1 represents an integer of 1 or more,
in Formula (4), $R^{11}$ represents a hydrogen atom or methyl,
$B^2$ represents a linking group,
$R^{15}$ and $R^{16}$ represent an alkyl group or an aryl group,
x1, x2, and x3 represent an integer of 0 or more,
a sum of x1, x2, and x3 is an integer of 1 to 100,
y1 represents an integer of 1 to 30, and
Z represents a group represented by Formula (Z), and

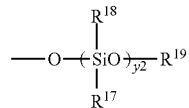

(Formula Z)

in Formula (Z), $R^{17}$ and $R^{18}$ represent an alkyl group or an aryl group,
$R^{19}$ represents an unsubstituted alkyl group having 1 to 4 carbon atoms, and
y2 represents an integer of 1 to 100.

<4> The solid electrolyte composition according to any one of <1> to <3>,
in which the polymer chain $P^C$ is a polymer chain of a polymerizable compound selected from (meth)acrylic acid, a (meth)acrylic acid ester compound, or a (meth)acrylonitrile compound.

<5> The solid electrolyte composition according to any one of <1> to <4>,
in which the polymer is a reactant of a compound represented by Formula 2 and a polymerizable compound forming the polymer chain $P^C$,

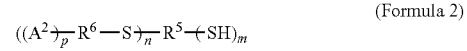

(Formula 2)

in the formula, $R^5$ represents an (m+n)-valent linking group,
$R^6$ represents a single bond or a linking group,
$A^2$ represents an acidic group, a group having a basic nitrogen atom, a urea group, a urethane group, an alkoxysilyl group, an epoxy group, an isocyanate group, or a hydroxyl group, p represents an integer of 1 to 10,
m represents an integer of 1 to 8,
n represents an integer of 2 to 9, and
m+n represents an integer of 3 to 10.

<6> The solid electrolyte composition according to any one of <1> to <5>,
in which the inorganic solid electrolyte is represented by Formula (1),

(1)

in the formula, L represents an element selected from Li, Na, or K, M represents an element selected from B, Zn, Sn, Si, Cu, Ga, Sb, Al, or Ge, A represents an element selected from I, Br, Cl, or F, and a1 to e1 represent compositional ratios between the respective elements, and
a1:b1:c1:d1:e1 satisfies 1 to 12:0 to 5:1:2 to 12:0 to 10.

<7> The solid electrolyte composition according to any one of <1> to <6>, further comprising a dispersion medium.

<8> The solid electrolyte composition according to <7>,
in which the dispersion medium is selected from a ketone compound, an aliphatic compound, or an ester compound.

<9> The solid electrolyte composition according to any one of <1> to <8>, further comprising an active material.

<10> A sheet for an all-solid state secondary battery, the sheet comprising a layer that is formed of the solid electrolyte composition according to any one of <1> to <9>.

<11> An electrode sheet for an all-solid state secondary battery, the electrode sheet comprising:
an active material layer formed of the solid electrolyte composition according to <9>.

<12> An all-solid state secondary battery comprising a positive electrode active material layer, a solid electrolyte layer, and a negative electrode active material layer in this order,
in which at least one of the positive electrode active material layer, the solid electrolyte layer, or the negative electrode active material layer is formed of the solid electrolyte composition according to any one of <1> to <9>.

<13> A method of manufacturing a sheet for an all-solid state secondary battery, the method comprising forming a film using the solid electrolyte composition according to any one of <1> to <9>.

<14> A method of manufacturing an all-solid state secondary battery, the method comprising manufacturing the all-solid state secondary battery through the method according to <13>.

The solid electrolyte composition according to the present invention has excellent dispersibility, and can form a sheet or a constituent layer having strong binding properties of solid particles can be formed. The sheet for an all-solid state secondary battery according to the aspect of the present invention exhibits strong binding properties between solid particles. The all-solid state secondary battery according to the aspect of the present invention exhibits excellent battery performance. In addition, in the method of manufacturing a sheet for an all-solid state secondary battery, the electrode sheet for an all-solid state secondary battery, and the method of manufacturing an all-solid state secondary battery according to the aspect of the present invention, the sheet for an all-solid state secondary battery and the all-solid state secondary battery according to the aspect of the present invention having the above-described excellent characteristics can be manufactured.

The above-described and other characteristics and advantageous effects of the present invention will be clarified from the following description appropriately with reference to the accompanying drawings.

DESCRIPTION OF THE PREFERRED EMBODIMENTS

Figure 1:
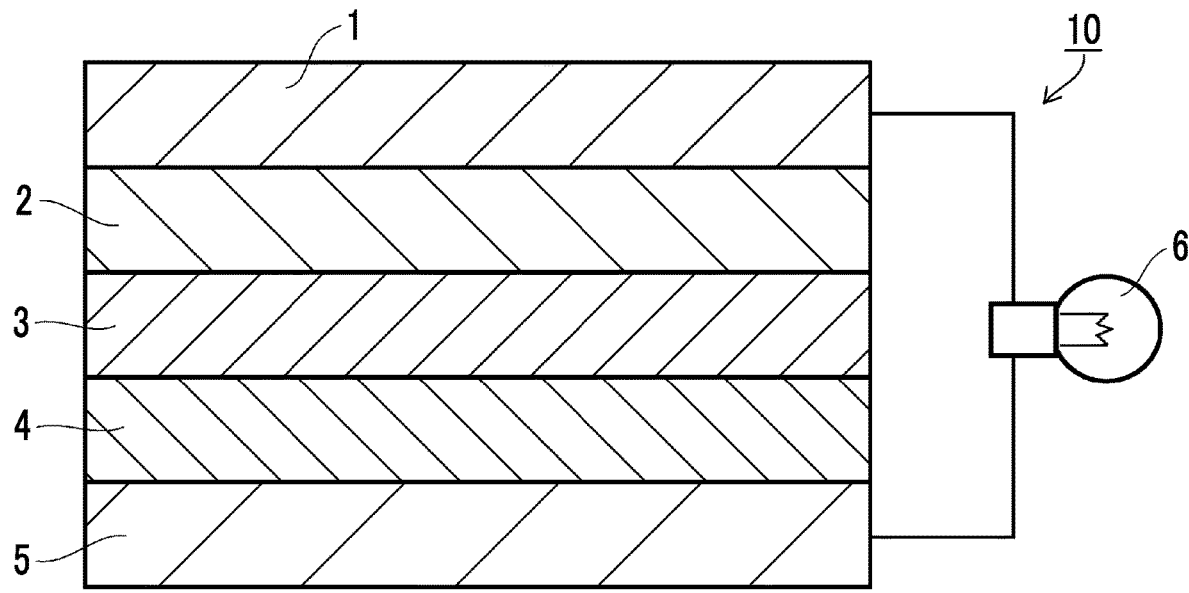
FIG. 1 is a vertical cross-sectional view schematically showing an all-solid state secondary battery according to a preferred embodiment of the present invention.

In the present specification, numerical ranges represented by "to" include numerical values before and after "to" as lower limit values and upper limit values.

In the description of the present specification, the simple expression "acryl" or "(meth)acryl" refers to acryl and/or methacryl.

In the present specification, the expression of a compound (for example, in a case where a compound is represented by an expression with "compound" added to the end) refers to not only the compound itself but also a salt or an ion thereof. In addition, this expression also refers to a derivative obtained by modifying a part of the compound, for example, by introducing a substituent into the compound within a range where desired effects are exhibited.

A substituent, a linking group, or the like (hereinafter, referred to as "substituent or the like") is not specified in the present specification regarding whether to be substituted or unsubstituted may have an appropriate substituent. Accordingly, even in a case where a YYY group is simply described in the present specification, this YYY group includes not only an aspect having a substituent but also an aspect not having a substituent. The same shall be applied to a compound which is not specified in the present specification regarding whether to be substituted or unsubstituted. Preferable examples of the substituent include respective substituents that can be used as $R^f$ in Formula 1A described below.

In the present specification, in a case where a plurality of substituents or the like represented by a specific reference numeral are present or a plurality of substituents or the like are simultaneously or alternatively defined, the respective substituents or the like may be the same as or different from each other. In addition, unless specified otherwise, in a case where a plurality of substituents or the like are adjacent to each other, the substituents may be linked or fused to each other to form a ring.

[Solid Electrolyte Composition]

A solid electrolyte composition (also referred to as "inorganic solid electrolyte-containing composition") according to an embodiment of the present invention comprises: an inorganic solid electrolyte having ion conductivity of a metal belonging to Group 1 or Group 2 in the periodic table; and a polymer (also referred to as "branched polymer") represented by Formula 1 described below and having a branched structure. This polymer includes: a polymer chain $P^C$ bonded to the branched structure; and a partial structure that has a group $A^1$ having adsorption to solid particles. In a case where the solid electrolyte composition includes a dispersion medium, this branched polymer functions as a dispersant that disperses solid particles in the dispersion medium with high dispersibility. In addition, in a sheet or a constituent layer formed of the solid electrolyte composition, the branched polymer may also function as a binder that binds the solid particles (for example, particles of the inorganic solid electrolyte, the inorganic solid electrolyte and the active material, and particles of the active material) and further binds a current collector and solid particles.

In The solid electrolyte composition according to the embodiment of the present invention, solid particles can be highly dispersed, and excellent dispersibility is exhibited. It is presumed that the polymer chains $P^C$ of the branched polymers bound to different solid particles act as a (steric) repulsion group to each other such that aggregation of the solid particles is suppressed and the solid particles are highly dispersed in the dispersion medium. As a result, the solid electrolyte composition according to the embodiment of the present invention exhibits excellent dispersibility.

In addition, in a case where a sheet or a constituent layer is formed using the solid electrolyte composition according to the embodiment of the present invention, solid particles can be strongly bound to each other. Further, in a case where an active material layer is formed using the solid electrolyte composition, not only solid particles but also solid particles and a current collector can be strongly bound to each other. As a result, an all-solid state secondary battery including a sheet or a constituent layer that is formed using the solid electrolyte composition according to the embodiment of the present invention exhibits excellent battery performance. The details of the reason for this are not clear but considered to be as follows. That is, the branched polymer has properties of absorbing or binding to solid particles due to the group $A^1$ having adsorption to solid particles. On the other hand, the polymer chain $P^C$ in the branched polymer has low surface energy and is not likely to adsorb to (is likely to repel) solid particles having high polarity. The branched polymer includes, in the molecules, the partial structure that is likely to adsorb to solid particles and the polymer chain $P^C$ that is not likely to adsorb to solid particles and further has a branched molecular structure. Therefore, the polymer chain $P^C$ and the partial structure that is likely to adsorb to solid particles effectively functions, and the polymer chain $P^C$ spreads in the dispersion medium such that the partial structure that is likely to adsorb to solid particles are more likely to adsorb to solid particle surfaces. As a result, in the sheet or the constituent layer, the binding properties to the solid particles are excellent. Further, it is presumed that the branched polymer having the above-described molecular structure exhibits properties of being soluble in the dispersion medium but partially coating solid particle surfaces without coating the entirety of the solid particle surfaces. In the sheet or the constituent layer, contact between the solid particles in the surface-coated state is not inhibited by the branched polymer, and an ion conduction path or an electron conduction path formed by contact between the solid particles can be sufficiently constructed. Therefore, it is presumed that an increase in interface resistance between the solid particles is suppressed and high battery performance is exhibited.

It is preferable that the solid electrolyte composition according to the embodiment of the present invention includes a dispersion medium. In this case, a mixed aspect of the inorganic solid electrolyte, the branched polymer, and the dispersion medium is not particularly limited and is preferably a slurry in which at least the inorganic solid electrolyte are dispersed in the dispersion medium.

In a case where a slurry is prepared using the solid electrolyte composition including the dispersion medium, the solid particles of the inorganic solid electrolyte and the active material, the conductive auxiliary agent, and the like that are appropriately used in combination can be favorably dispersed in the dispersion medium, and binding properties of solid particles in the obtained sheet or constituent layer can be further improved.

It is preferable that the solid electrolyte composition according to the embodiment of the present invention is used as a material for forming a sheet for an all-solid state secondary battery or a solid electrolyte layer or an active material layer in an all-solid state secondary battery.

The moisture content (also referred to as "water content") in the solid electrolyte composition according to the embodiment of the present invention is not particularly limited and is preferably 500 ppm or lower, more preferably 200 ppm or lower, still more preferably 100 ppm or lower, and still more preferably 50 ppm or lower. In a case where the moisture content of the solid electrolyte composition is low, deterioration of the inorganic solid electrolyte can be suppressed. The moisture content refers to the amount of water (the mass ratio thereof to the solid electrolyte composition) in the solid electrolyte composition and specifically is a value measured by Karl Fischer titration after filtering the solid electrolyte composition the through a membrane filter having a pore size of 0.02 μm.

Hereinafter, the components that are included in the solid electrolyte composition according to the embodiment of the present invention and components that may be included therein will be described.

<Inorganic Solid Electrolyte>

The solid electrolyte composition according to the embodiment of the present invention includes an inorganic solid electrolyte.

In the present invention, the inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic matter as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has ion conductivity of a metal belonging to Group 1 or Group 2 in the periodic table and generally does not have electron conductivity. In a case where an all-solid state secondary battery according to the embodiment of the present invention is a lithium ion battery, the inorganic solid electrolyte preferably has ion conductivity of lithium ions.

The inorganic solid electrolyte can be appropriately selected from solid electrolyte materials that are typically used for an all-solid state secondary battery. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based solid electrolyte. In the present invention, from the viewpoint that a more favorable interface can be formed between the active material and the inorganic solid electrolyte, a sulfide-based inorganic solid electrolyte is preferably used.

(i) Sulfide-Based Inorganic Solid Electrolyte

The sulfide-based inorganic solid electrolyte is preferably a compound that contains a sulfur atom, has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. However, the sulfide-based inorganic solid electrolyte may include elements other than Li, S, and P depending on the purposes or cases.

Examples of the sulfide-based inorganic solid electrolyte include a lithium ion-conductive inorganic solid electrolyte satisfying a composition represented by Formula (1).

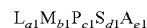

$$L_{a1}M_{b1}P_{c1}S_{d1}A_{e1} \qquad (1)$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F, and a1 to e1 represent the compositional ratios between the respective elements, and a1:b1:e1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the mixing amounts of raw material compounds to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, $SnS$, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_9S:P_2S_5$. In a case where the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolyte

The oxide-based inorganic solid electrolyte is preferably a compound that contains an oxygen atom, has ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited but is realistically $1\times10^{-1}$ S/cm or less.

Specific examples of the compound include: $Li_{xa}La_{ya}TiO_3$ (xa satisfies $0.3 \leq xa \leq 0.7$ and ya satisfies $0.3 \leq ya \leq 0.7$) (LLT); $Li_{xb}La_{yb}Zr_{zb}M^{bb}_{mb}O_{nb}$ ($M^{bb}$ represents one or more elements selected from Al, Mg, Ca, Sr, V, Nb, Ta, Ti, Ge, In, or Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$); $Li_{xc}B_{yc}M^{cc}_{zc}O_{nc}$ ($M^{cc}$ represents one or more elements selected from C, S, Al, Si, Ga, Ge, In, or Sn, xc satisfies $0 < xc \leq 5$, yc satisfies $0 < yc \leq 1$, zc satisfies $0 < zc \leq 1$, and nc satisfies $0 < nc \leq 6$); $Li_{xd}(Al,Ga)_{yd}(Ti,Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$); $Li_{(3-2xe)}M^{ee}_{xe}D^{ee}O$ (xe represents a number of 0 to 0.1, $M^{ee}$ represents a divalent metal atom, and $D^{ee}$ represents a halogen atom or a combination of two or more halogen atoms); $Li_{xf}Si_{yf}O_{zf}$ (xf satisfies $1 \leq xf \leq 5$, yf satisfies $0 < yf \leq 3$, and zf satisfies $1 \leq zf \leq 10$); $Li_{xg}S_{yg}O_{zg}$ (xg satisfies $1 \leq xg \leq 3$, yg satisfies $0 < yg \leq 2$, and zg satisfies $1 \leq zg \leq 10$); $Li_3BO_3$; $Li_3BO_3$—$Li_2SO_4$; $Li_2O$—$B_2O_3$—$P_2O_5$; $Li_2O$—$SiO_2$, $Li_6BaLa_2Ta_2O_{12}$; $Li_3PO_{(4-3/2w)}N_w$ (w satisfies w<1); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al,Ga)_{xh}(Ti,Ge)_{2-xh}Si_{yh}P_{3-yh}O_{12}$ (xh represents $0 \leq xh \leq 1$, and yh represents $0 \leq yh \leq 1$); and $Li_7La_3Zr_2O_{12}$ (LLZ) having a garnet-type crystal structure.

In addition, phosphorus compounds containing Li, P, and O are also desirable. Examples of the phosphorus compound include: lithium phosphate ($Li_3PO_4$); LiPON in which some of oxygen elements in lithium phosphate are substituted with nitrogen elements; and $LiPOD^1$ ($D^1$ preferably represents one or more elements selected from Ti, V, Cr, Mn, Fe, Co, Ni, Cu, Zr, Nb, Mo, Ru, Ag, Ta, W, Pt, or Au). Further, for example, $LiA^1ON$ ($A^1$ represents one or more elements selected from Si, B, Ge, Al, C, or Ga) can be preferably used.

(iii) Halide-Based Inorganic Solid Electrolyte

The halide-based inorganic solid electrolyte is preferably a compound that is generally used and contains a halogen atom, has ion conductivity of a metal belonging to Group 1 or Group 2 in the periodic table, and has electron-insulating properties.

The halide-based inorganic solid electrolyte is not particularly limited, and examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or $Li_3YCl_6$ is preferable.

(iv) Hydride-Based Inorganic Solid Electrolyte

The hydride-based inorganic solid electrolyte is preferably a compound that is generally used and contains a hydrogen atom, has ion conductivity of a metal belonging to Group 1 or Group 2 in the periodic table, and has electron-insulating properties.

The hydride-based inorganic solid electrolyte is not particularly limited, and examples thereof include $LiBH_4$, $Li_4(BH_4)_3I$, and $3LiBH_4$—LiCl.

The inorganic solid electrolyte is preferably in the form of particles. In this case, the volume average particle size of the inorganic solid electrolyte is not particularly limited, but is preferably 0.01 μm or more and more preferably 0.1 μm or more. The upper limit is preferably 100 μm or less and more preferably 50 μm or less. The volume average particle size of the inorganic solid electrolyte is measured in the following order. The inorganic solid electrolyte particles are diluted using water (heptane in a case where the inorganic solid electrolyte is unstable in water) in a 20 mL sample bottle to prepare 1 mass % of a dispersion liquid. The diluted dispersion liquid specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five specimens are prepared and the average value thereof is adopted.

As the inorganic solid electrolyte, one kind may be used alone, or two or more kinds may be used in combination.

In a case where a solid electrolyte layer is formed, the mass (mg) of the inorganic solid electrolyte per unit area ($cm^2$) of the solid electrolyte layer (weight per unit area) is not particularly limited. The mass (mg) of the inorganic solid electrolyte can be appropriately determined depending on the designed battery capacity and may be, for example, 1 to 100 $mg/cm^2$.

Here, in a case where the solid electrolyte composition includes an active material described below, regarding the weight of the inorganic solid electrolyte per unit area, the total amount of the active material and the inorganic solid electrolyte is preferably in the above-described range.

From the viewpoints of dispersibility, a reduction in interface resistance, and binding properties, the content of the inorganic solid electrolyte in the solid electrolyte composition is preferably 50 mass % or higher, more preferably 70 mass % or higher, and still more preferably 90 mass % or higher with respect to 100 mass % of the solid content. From the same viewpoint, the upper limit is preferably 99.9 mass % or lower, more preferably 99.5 mass % or lower, and particularly preferably 99 mass % or lower.

Here, in a case where the solid electrolyte composition contains an active material described below, the content of the inorganic solid electrolyte in the solid electrolyte composition, the total content of the active material and the inorganic solid electrolyte is preferably in the above-described range.

In the present specification, the solid content (solid component) refers to components that neither volatilize nor evaporate and disappear in a case where the solid electrolyte composition is dried at 170° C. for 6 hours in a nitrogen atmosphere at a pressure of 1 mmHg Typically, the solid content refers to components other than a dispersion medium described below.

<Polymer Represented by Formula 1>

The solid electrolyte composition according to the embodiment of the present invention includes the polymer represented by Formula 1. As described above, the polymer (branched polymer) functions as a binder and preferably as a dispersant.

In the solid electrolyte composition according to the embodiment of the present invention, in a case where the solid electrolyte composition includes a dispersion medium described below, the branched polymer may be included as a solid such as particles. However, it is preferable that the branched polymer is included in a state where it is dissolved in the dispersion medium.

It is preferable that the branched polymer is amorphous. In the present invention, "amorphous polymer" typically refers to a resin that shows no endothermic peak caused by crystal melting during measurement of the glass transition temperature.

The mass average molecular weight of the branched polymer is not particularly limited. For example, the mass average molecular weight is preferably 3,000 or higher, more preferably 5,000 or higher, still more preferably 7,000 or higher, still more preferably 10,000 or higher, and still more preferably 13,000 or higher. The upper limit is practically 1,000,000 or lower, preferably 300,000 or lower, more preferably 100,000 or lower, still more preferably 70,000 or lower, still more preferably 50,000 or lower, and still more preferably 40,000 or lower.

Measurement of Molecular Weight

In the present invention, as the mass average molecular weight, a mass average molecular weight in terms of standard polystyrene is measured by gel permeation chromatography (GPC). Regarding a measurement method, basically, the following condition 1 or condition 2 (preferred) is used. An appropriate eluent may be appropriately selected and used depending on the kind of the polymer (for example, the branched polymer) to be measured.

(Condition 1)

Column: a column in which two TOSOH TSKgel Super AWM-H's are linked

Carrier: 10 mM LiBr/N-methylpyrrolidone

Measurement temperature: 40° C.

Carrier flow rate: 1.0 ml/min

Sample concentration: 0.1 mass %

Detector: refractive index (RI) detector (Condition 2)

Column: a column in which TOSOH TSK gel Super HZM-H, TOSOH TSK gel Super HZ4000, and TOSOH TSK gel Super HZ2000 are linked to each other Carrier: tetrahydrofuran Measurement temperature: 40° C.

Carrier flow rate: 1.0 ml/min

Sample concentration: 0.1 mass %

Detector: refractive index (RI) detector

The branched polymer may be a non-crosslinked polymer or a crosslinked polymer. In addition, in a case where the crosslinking of the branched polymer progresses due to heating or voltage application, the molecular weight may be higher than the above-described molecular weight. At the start of using the all-solid state secondary battery, the mass average molecular weight of the branched polymer is preferably in the above-described range.

The moisture content of the branched polymer is preferably 100 ppm (by mass) or lower. In addition, the branched polymer may be dried by crystallization, or the branched polymer dispersion liquid may be used as it is.

The branched polymer has a structure represented by Formula 1.

In Formula 1, in a case where a plurality of linking groups, a plurality of polymer chains, and a plurality of adsorption groups $A^1$ represented by the respective reference numerals are present, the respective groups may be the same as or different from each other. In addition, in a case where a plurality of the partial structures ($-S-R^2-(A^1)p$) or chains ($-S-R^3-P^C$) linked to $R^1$ are present, these partial structures or chains may be the same as or different from each other.

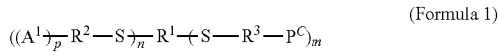

(Formula 1)

In Formula 1, $R^1$ represents an (m+n)-valent linking group. $A^1$ represents an acidic group, a group having a basic nitrogen atom, a urea group, a urethane group, an alkoxysilyl group, an epoxy group, an isocyanate group, or a hydroxyl group. p represents an integer of 1 to 10. $R^2$ and $R^3$ represent a single bond or a linking group. $P^C$ represents a polymer chain that includes a component having at least one selected from a fluoroalkylene group or a siloxane structure. m represents an integer of 1 to 8, and n represents an integer of 2 to 9. m+n represents an integer of 3 to 10.

$R^1$ represents a (m+n)-valent linking group, which is typically a linking group (organic linking group) consisting of an organic group having a skeleton to which a carbon atom is linked through a covalent bond and preferably a linking group having an oxygen atom. The molecular weight of the linking group is not particularly limited and, for example, is preferably 200 or higher and more preferably 300 or higher. The upper limit of the molecular weight is preferably 5,000 or lower, more preferably 4,000 or lower, and still more preferably 3,000 or lower. It is preferable that the linking group does not consist of only one tetravalent carbon atom.

The valence of the linking group is 3 to 10 and has the same definition and the same preferable range as those of (m+n) as the sum of m and n described below.

It is preferable that the linking group has a group represented by the following Formula 1a. It is preferable that the number of groups represented by Formula 1a in the linking group $R^1$ is the same as (m+n) that is the valence of $R^1$. In a case where the linking group has a plurality of groups represented by Formula 1a, the groups may be the same as or different from each other.

$$-(CR^f{}_2)_n-O(C=O)-(CR^f{}_2)_n-\quad \text{(Formula 1a)}$$

In Formula (1a), n represents an integer of 0 to 10, preferably an integer of 1 to 6, and more preferably 1 or 2.

$R^f$ represents a hydrogen atom or a substituent and preferably a hydrogen atom. The substituent which may be used as $R^f$ is not particularly limited, and examples thereof include a halogen atom (for example, a fluorine atom, a chlorine atom, an iodine atom, or a bromine atom), an alkyl group (having preferably 1 to 12 carbon atoms, more preferably 1 to 6 carbon atoms, and still more preferably 1 to 3 carbon atoms), an alkoxy group (having preferably 1 to 12 carbon atoms, more preferably 1 to 6 carbon atoms, and still more preferably 1 to 3 carbon atoms), an acyl group (having preferably 2 to 12 carbon atoms, more preferably 2 to 6 carbon atoms, and still more preferably 2 or 3 carbon atoms), an aryl group (having preferably 6 to 22 carbon atoms and more preferably 6 to 10 carbon atoms), an alkenyl group (having preferably 2 to 12 carbon atoms and more preferably 2 to 5 carbon atoms), a hydroxy group, a nitro group, a cyano group, a mercapto group, an amino group, an amido group, and an acidic group (for example, a carboxyl group, a phosphate group, or a sulfonate group). Each of the acidic groups may be a salt thereof. Examples of a counter ion include an alkali metal ion an alkali earth metal ion, an ammonium ion, and an alkylammonium ion.

It is preferable that the linking group $R^1$ is a linking group represented by the following Formula 1A or Formula 1B.

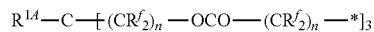

Formula 1A

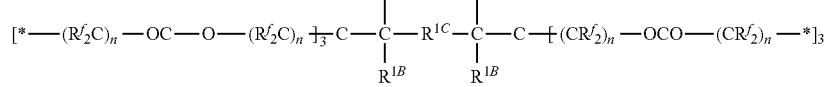

Formula 1B

In both the formulae, $R^f$ and n have the same definitions and the same preferable ranges as those of $R^f$ and n in Formula 1a. * represents a binding site to a sulfur atom in Formula 1.

In Formula 1A, $R^{1A}$ represents a hydrogen atom or a substituent. The substituent which can be used as $R^{1A}$ is not particularly limited, and examples thereof include the respective substituents which can be used as $R^f$ and the group represented by Formula 1a. In particular, an alkyl group or the group represented by Formula 1a is preferable. The number of carbon atoms in the alkyl group is preferably 1 to 12, more preferably 1 to 6, and still more preferably 1 to 3. The substituent which can be used as $R^{1A}$ may have one or two or more substituents, and the substituent which may be further included is not particularly limited, and examples thereof include the respective substituents which can be used as $R^f$. In particular, a hydroxy group is preferable. Examples of the substituent which may further have one or two or more substituents include a hydroxyalkyl group (the number of carbon atoms is as described above). Specifically, hydroxymethyl is preferable.

In Formula 1B, $R^{1C}$ represents a linking group. The linking group that can be used as $R^{1C}$ is not particularly limited and is preferably an alkylene group having 1 to 30 carbon atoms, a cycloalkylene group having 3 to 12 carbon atoms, an arylene group having 6 to 24 carbon atoms, a heteroarylene group having 3 to 12 carbon atoms, an ether group (—O—), a sulfide group (—S—), a phosphinidene group (—PR—: R represents a hydrogen atom or an alkyl group having 1 to 6 carbon atoms), a silylene group (—SiR$^{S1}$R$^{S2}$—: R$^{S1}$ and R$^{S2}$ represent a hydrogen atom or an alkyl group having 1 to 6 carbon atoms), a carbonyl group, an imino group (—NR$^N$—: R$^N$ represents a binding site, a hydrogen atom, an alkyl group having 1 to 6 carbon atoms, or an aryl group having 6 to 10 carbon atoms), or a linking group including a combination of two or more (preferably 2 to 10) thereof. In particular, an alkylene group, an ether group, a sulfide group, a carbonyl group, or a linking group including a combination of two or more (preferably 2 to 5) thereof is preferable, and an ether group is more preferable. $R^{1B}$ represents a hydrogen atom or a substituent and preferably a hydrogen atom. The substituent which can be used as $R^{1B}$ is not particularly limited, and examples thereof include the respective substituents which can be used as $R^f$.

In Formula 1A and Formula 1B, groups represented by the same reference numeral may be the same as or different from each other.

In addition to the above-described linking groups, as the linking group $R^1$, for example, a linking group in Formula 1B in which one or two or more groups represented by Formula 1a are substituted with each of the substituents which can be used as R', in particular, hydroxymethyl is also a preferable aspect.

As the linking group $R^1$, a linking group represented by any one of the following Formulae 1C to 1H is also preferable. In each of the formulae, * represents a binding site to S in Formula 1.

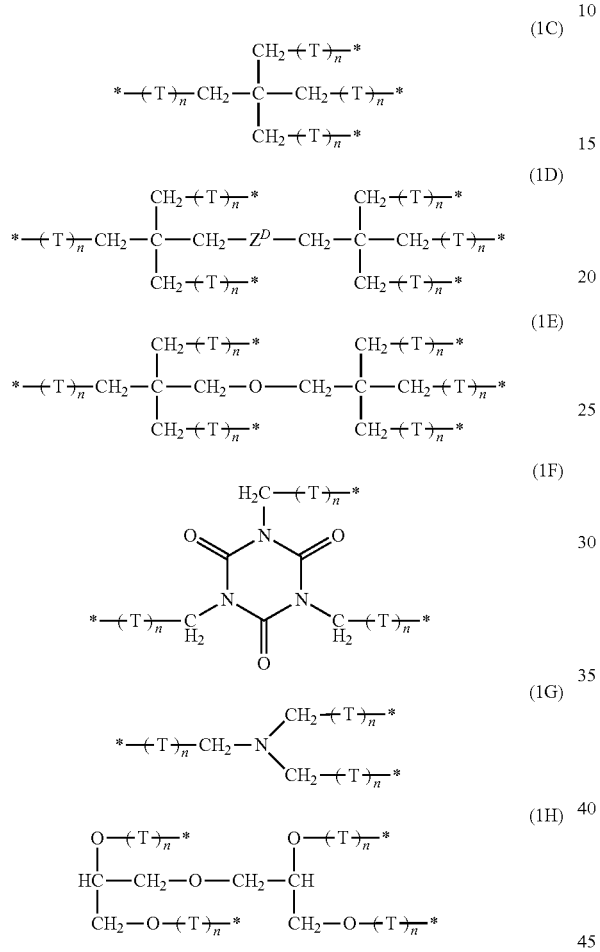

In Formulae 1C to 1H, T represents a linking group and preferably a group represented by any one of the following Formulae T1 to T6 or a linking group including a combination of two or more (preferably two or three). Examples of the linking group including a combination include a linking group (—OCO-alkylene group) including a combination of the linking group represented by Formula T6 and the linking group represented by Formula T1. In the group represented by any one of Formulae T1 to T6, a sulfur atom in Formula 1 may be bound to any binding site. However, in a case where T represents an oxyalkylene group (the group represented by any one of Formulae T2 to T5) or an —OCO-alkylene group, it is preferable that a sulfur atom in Formula 1 is bound to a carbon atom (binding site) at a terminal.

A plurality of T's present in each of the formulae may be the same as or different from each other.

$Z^D$ represents a linking group and is preferably a group represented by the following formula Z1 or Z2.

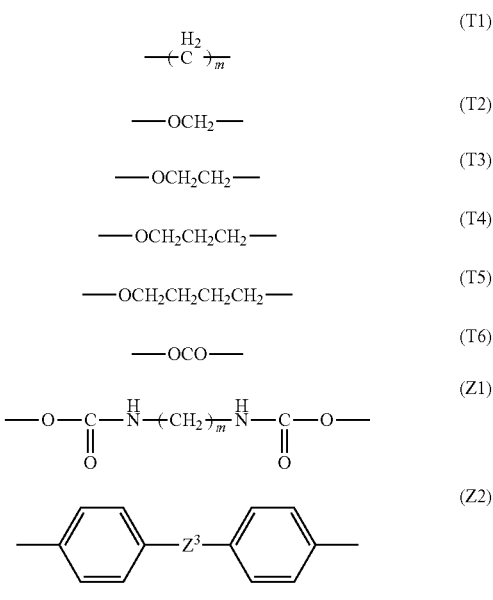

In each of Formula 1C to 1H, n represents an integer, preferably an integer of 0 to 14, more preferably an integer of 0 to 5, and still more preferably an integer of 1 to 3.

In each of Formula T1 and Formula Z1, m represents an integer of 1 to 8, more preferably an integer of 1 to 5, and still more preferably an integer of 1 to 3.

$Z^3$ represents a linking group, preferably an alkylene group having 1 to 12 carbon atoms, and more preferably an alkylene group having 1 to 6 carbon atoms. In particular, a 2,2-propanediyl group is still more preferable.

Hereinafter, specific examples of the linking group $R^1$ will be shown, but the present invention is not limited thereto. In each of the specific examples, * represents a binding site to a sulfur atom in Formula 1.

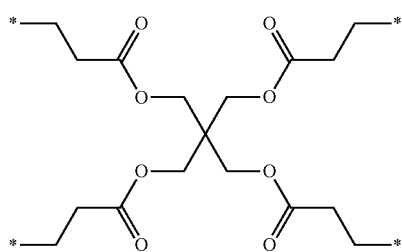

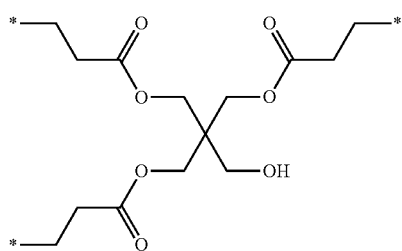

-continued

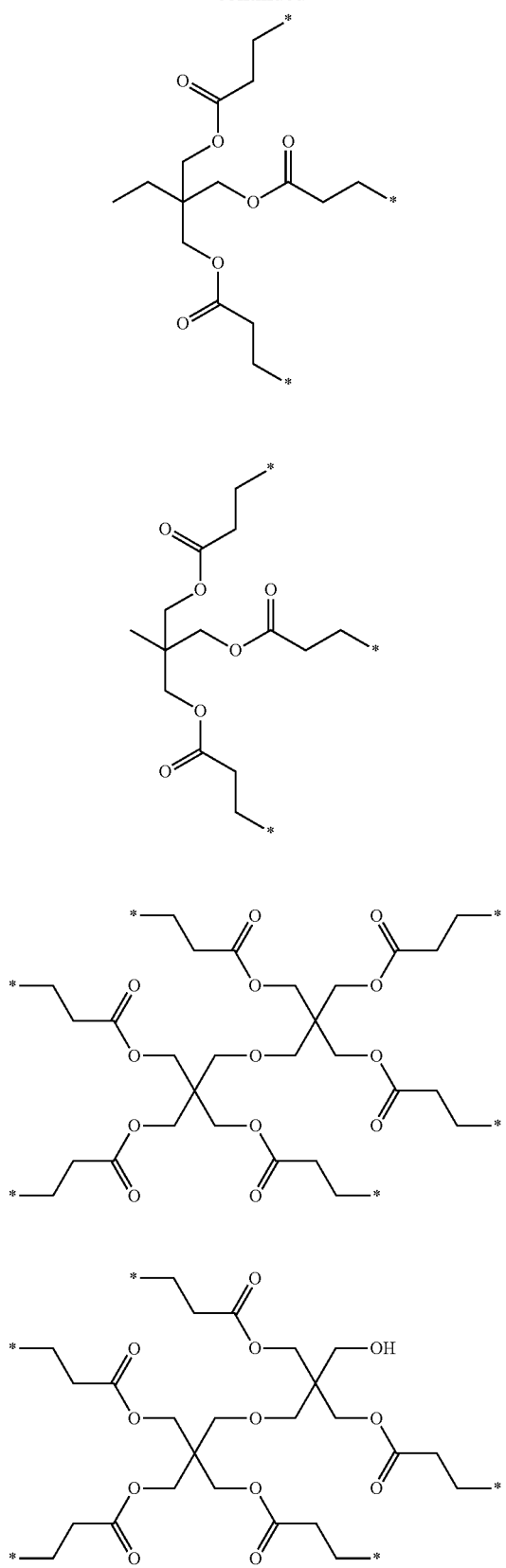

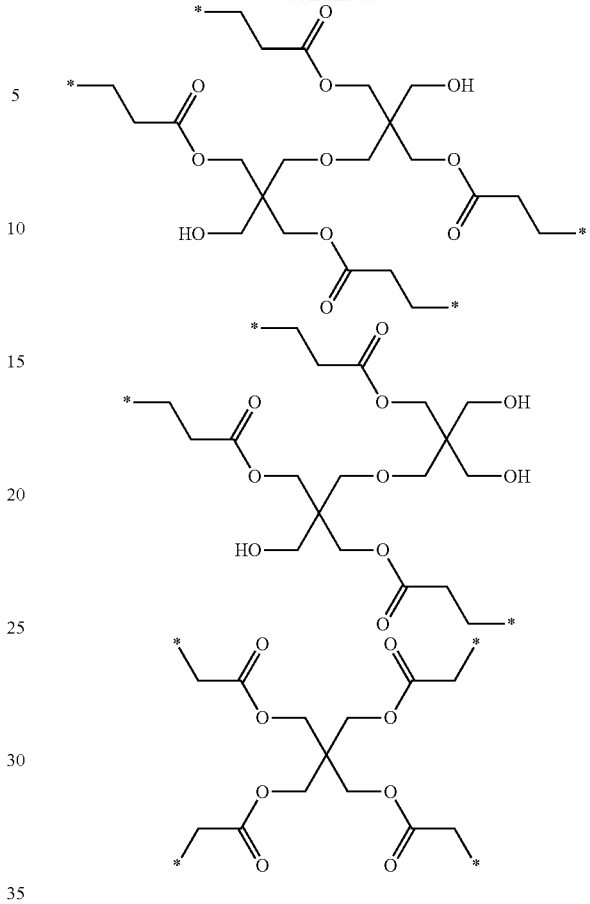

In Formula 1, $R^2$ and $R^3$ each independently represent a single bond or a linking group. $R^2$ represents preferably a linking group, and $R^3$ represents preferably a single bond.

The linking group that can be used as each of $R^2$ and $R^3$ is not particularly limited, and it is preferable that the linking group is not a linking group consisting of an oligomer or a polymer including two or more repeating units. Examples of the linking group include the linking groups (the valence is adjusted depending on p described below) which can be used as $R^{1C}$ in Formula 1B.

However, as $-R^2-(A^1)p$ in the formula, a polymer chain can be used. For example, a component consisting of a polymerizable compound forming the polymer chain $P^C$ described below and preferably a polymer chain including at least one component having p $A^1$'s described below can also be adopted. More specifically, for example, a polymethacrylic chain including polymers D-13 to D-17 synthesized in Example can be adopted.

In Formula 1, the polymer chain $P^C$ represents a polymer chain that includes a component having at least one selected from a fluoroalkylene group or a siloxane structure. This component may include a fluoroalkylene group or a siloxane structure and preferably any one of a fluoroalkylene group or a siloxane structure. It is preferable that the polymer chain $P^C$ is a polymer chain including a component having a fluoroalkylene group. The fluoroalkylene group or the siloxane structure in the component may be incorporated into a side chain or the main chain of the polymer chain $P^C$.

However, it is preferable that the fluoroalkylene group or the siloxane structure is incorporated into a side chain of the polymer chain $P^C$.

As described above, this polymer chain $P^C$ has low surface energy and is introduced into the branched polymer, which contributes to the dispersing of solid particles in the solid electrolyte composition and contributes to the binding properties of the solid particles in the sheet or the constituent layer.

The polymer chain $P^C$ is not particularly limited as long as it is a polymer chain that includes the above-described component and reacts with a sulfur atom or a linking group $R^3$ in Formula 1 to be introduced into the polymer represented by Formula 1. The polymer chain $P^C$ is applicable to a chain consisting of a typical polymer as long as it includes the above-described component. The typical polymer is not particularly limited and examples thereof include a chain consisting of a vinyl polymer, a (meth)acrylic polymer, polyether, polysiloxane, or polyester and a chain including a combination of two (preferably two or three) of the above-described chains.

Examples of the polymer chain $P^C$ include a chain consisting of a polymer of a polymerizable compound that has one or more (preferably 1 to 4 and more preferably 1) ethylenically unsaturated groups (addition polymerizable unsaturated groups) at a terminal or a side chain of the molecular structure and includes at least one selected from a fluoroalkylene group or a siloxane structure. The ethylenically unsaturated group is not particularly limited as long as it is a group forming the main chain of the polymer chain $P^C$ by polymerization, and examples thereof include a vinyl group and a (meth)acryloyl group. Preferable examples of the polymer chain $P^C$ include a chain of a vinyl polymer and a chain of a (meth)acrylic polymer. Preferable examples of the polymerizable compound forming the polymer chain $P^C$ include a polymerizable compound having at least one selected from a fluoroalkylene group or a siloxane structure, for example, a styrene compound, a vinylnaphthalene compound, a vinylcarbazole compound, a (meth)acrylic acid compound, a (meth)acrylic acid ester compound, a (meth)acrylamide compound, a (meth)acrylonitrile compound, an allyl compound, a vinyl ether compound, a vinyl ester compound, a dialkyl itaconate compound, a cyclic olefin compound, a diene compound, a carboxylic acid vinyl ester compound, or a compound such as unsaturated carboxylic anhydride.

As the polymer chain $P^C$, among the chains of the polymers of the polymerizable compounds, a polymer chain (referred to as "a chain of a (meth)acrylic polymer") including a component derived from a polymerizable compound selected from (meth)acrylic acid, a (meth)acrylic acid ester compound, a (meth)acrylamide compound, or a (meth)acrylonitrile compound is preferable, a polymer chain including a component derived from a polymerizable compound selected from (meth)acrylic acid, a (meth)acrylic acid ester compound, or a (meth)acrylonitrile compound is more preferable, and a polymer chain of a polymerizable compound selected from (meth)acrylic acid, a (meth)acrylic acid ester compound, or a (meth)acrylonitrile compound is still more preferable.

In the polymerizable compound, the fluoroalkylene group or the siloxane structure may be directly bonded to the ethylenically unsaturated group but is preferably bonded to the ethylenically unsaturated group through a linking group. The linking group is not particularly limited, and examples thereof include the linking groups which can be used as $R^{1C}$ in Formula 1B. In particular, an ether group, a sulfide group, an imino group, a carbonyl group, or a linking group including a group of a combination of two or more (preferably 2 to 5) thereof is preferable, a linking group including a —CO—O— group of a combination of a carbonyl group and an ether group is more preferable, and a —CO—O— group is still more preferable.

This polymerizable compound includes a terminal group at an end portion (an end portion opposite to the ethylenically unsaturated group) of the fluoroalkylene group or the siloxane structure. The terminal group is not particularly limited, and examples thereof include a hydrogen atom and a substituent. The substituent which can be used as the terminal group is not particularly limited, and examples thereof include the substituents which can be used as $R^f$. As the terminal group, a hydrogen atom or a fluorine atom is preferable.

The fluoroalkylene group including the above-described component is an alkylene group in which at least one hydrogen atom is substituted with a fluorine atom, and the molecular structure thereof may be linear, branched, or cyclic and is preferably linear or branched. The number of carbon atoms in the fluoroalkylene group is not particularly limited and is preferably 1 to 20, more preferably 1 to 12, still more preferably 2 to 8, and still more preferably 2 to 7. An aspect where the lower limit of carbon atoms is 3 or more is a preferable aspect. In a case where the fluoroalkylene group is linear, an aspect where the lower limit of carbon atoms is 4 or more is a preferable aspect.

In the fluoroalkylene group, some hydrogen atoms may be substituted with fluorine atoms, or all the hydrogen atoms may be substituted with fluorine atoms. In the present invention, a fluoroalkylene group in which some hydrogen atoms are substituted with fluorine atoms is preferable, a fluoroalkylene group in which a carbon atom bonded to the linking group $R^3$ is not substituted with a fluorine atom and that includes a methylene group (—CH$_2$—) is more preferable, and a fluoroalkylene group in which two or three continuous carbon atoms including the carbon atom bonded to the linking group are not substituted with fluorine atoms and that includes an ethylene group (—CH$_2$—CH$_2$—) or a propylene group (—CH$_2$—CH$_2$—CH$_2$—) is still more preferable.

The fluoroalkylene group may have a substituent other than a fluorine atom, for example, may have a substituent (other than a fluorine atom) which can be used as $R^f$.

It is preferable that the component having a fluoroalkylene group is a component represented by Formula (3).

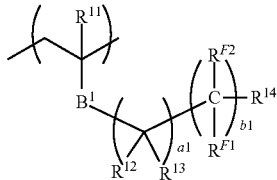

(Formula 3)

In Formula (3), $R^{11}$ represents a hydrogen atom or methyl.

$B^1$ represents a single bond or a linking group and preferably a linking group. The linking group which can be used as $B^1$ is not particularly limited, and examples thereof include the linking groups which can be used as $R^{1C}$ in Formula 1B. In particular, an ether group, a sulfide group, an imino group, a carbonyl group, or a linking group including a combination of two or more (preferably 2 to 5) thereof is preferable, and a —CO—O— group is more preferable.

$R^{12}$ and $R^{13}$ each independently represent a hydrogen atom, a hydroxy group or an alkyl group having 1 to 4 carbon atoms (which may have a fluorine atom as a substituent but preferably does not have a substituent), and preferably represent a hydrogen atom or a hydroxy group. $R^{12}$ and $R^{13}$ may be the same as or different from each other.

$R^{14}$ (represents a hydrogen atom or a fluorine atom.

$R^{F1}$ and $R^{F2}$ each independently represent a fluorine atom or a fluoroalkyl group having 1 to 4 carbon atoms. In the fluoroalkyl group which can be used as $R^{F1}$ and $R^{F2}$, some hydrogen atoms may be substituted with fluorine atoms, and a perfluoroalkyl group is preferable. The number of carbon atoms in the fluoroalkyl group is preferably 1 or 2 and more preferably 1. $R^{F1}$ and $R^{F2}$ each independently represent preferably a fluorine atom or trifluoromethyl and more preferably a fluorine atom. $R^{F1}$ and $R^{F2}$ may be the same as or different from each other, and it is preferable that both $R^{F1}$ and $R^{F2}$ represent a fluorine atom.

a1 is not particularly limited as long as it represents an integer of 0 or more. a1 represents preferably an integer of 0 to 10, more preferably an integer of 1 to 5, and still more preferably an integer of 1 to 3.

b1 is not particularly limited as long as it represents an integer of 1 or more. b1 represents preferably an integer of 1 to 20, more preferably an integer of 1 to 10, and still more preferably an integer of 2 to 6.

The sum of a1 and b1 in Formula (3) is not particularly limited as long as each of a1 and b1 is in the above-described range. For example, the numbers of carbon atoms in the fluoroalkylene groups are the same, and the preferable ranges thereof are the same.

In a case where a1 and b1 each independently represent an integer of 2 or more, a plurality of —C($R^{12}$)($R^{13}$)— groups and a plurality of —C($R^{F1}$)($R^{F2}$)— groups in Formula 3 may be the same as or different from each other, respectively.

Specific examples of the component having a fluoroalkylene group and the component represented by Formula 3 include those described regarding each of the branched polymers synthesized in Example below. However, the present invention is not limited to the examples.

Examples of the siloxane structure in the component include a structural unit represented by —Si($R^S_2$)—O— and a polymer chain (also referred to as "polysiloxane structure") including two or more structural unit represented by —Si($R^S_2$)—O—. In the structural unit, $R^S$ represents a hydrogen atom or a substituent, the substituent is not particularly limited, and examples thereof include a hydroxy group, an alkyl group (having preferably 1 to 12 carbon atoms, more preferably 1 to 6 carbon atoms, and still more preferably 1 to 3 carbon atoms), an alkenyl group (having preferably 2 to 12 carbon atoms, more preferably 2 to 6 carbon atoms, and still more preferably 2 or 3 carbon atoms), an alkoxy group (having preferably 1 to 24 carbon atoms, more preferably 1 to 12 carbon atoms, still more preferably 1 to 6 carbon atoms, and still more preferably 1 to 3 carbon atoms), an aryl group (having preferably 6 to 22 carbon atoms, more preferably 6 to 14 carbon atoms, and still more preferably 6 to 10 carbon atoms), and an aryloxy group (having preferably 6 to 22 carbon atoms, more preferably 6 to 14 carbon atoms, and still more preferably 6 to 10 carbon atoms), an aralkyl group (having preferably 7 to 23 carbon atoms, more preferably 7 to 15 carbon atoms, and still more preferably 7 to 11 carbon atoms), and a group represented by Formula Z described below. Among these, an alkyl group having 1 to 3 carbon atoms, a phenyl group, or a group represented by Formula Z described below is more preferable, and an alkyl group having 1 to 3 carbon atoms is still more preferable.

As the siloxane structure, a polymer chain of the structural unit is preferable, and the polymerization degree of all the structural units forming the polymer chain is not particularly limited and is preferably 1 to 200 and more preferably 1 to 100. The number-average molecular weight of the polymer chain is not particularly limited and is preferably 400 or higher, more preferably 800 or higher, and still more preferably 2,000 or higher. The upper limit is not particularly limited and is preferably 500,000 or lower, more preferably 100,000 or lower, and still more preferably 30,000 or lower. The number-average molecular weight of the polymer chain can be measured as a number-average molecular weight in terms of standard polystyrene using the same method as the mass average molecular weight of the branched polymer.

It is preferable that the component having a siloxane structure is a component represented by Formula (4).

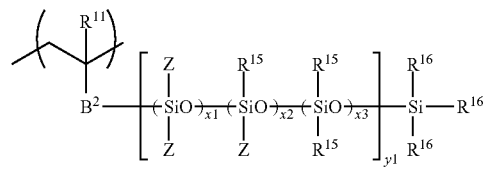

(Formula 4)

In Formula (4), $R^{11}$ represents a hydrogen atom or methyl.

$B^2$ represents a linking group. The linking group which can be used as $B^2$ is not particularly limited, and examples thereof include the linking groups which can be used as $R^{1C}$ in Formula 1B. In particular, an ether group, a sulfide group, an imino group, a carbonyl group, or a linking group including a group of a combination of two or more (preferably 2 to 5) thereof is preferable, and a linking group including a —CO—O— group is more preferable.

$R^{15}$ represents an alkyl group or an aryl group and preferably an alkyl group. The alkyl group and the aryl group which can be used as $R^{15}$ have the same definitions and the same preferable ranges as those of the alkyl group and the aryl group which can be used as $R^S$ in the structural unit, respectively. $R^{15}$ represents still more preferably methyl. Two $R^{15}$'s bonded to the same silicon atom may be the same as or different from each other and represent preferably methyl.

$R^{16}$ represents an alkyl group or an aryl group and preferably an alkyl group. Three $R^{16}$'s bonded to the same silicon atom may be the same as or different from each other. The alkyl group and the aryl group which can be used as $R^{16}$ have the same definitions and the same preferable ranges as those of the alkyl group and the aryl group which can be used as $R^S$ in the structural unit, respectively.

Z represents a group represented by Formula (Z).

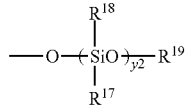

(Formula Z)

In Formula (Z), $R^{17}$ and $R^{18}$ each independently represent an alkyl group or an aryl group. The alkyl group and the aryl group which can be used as $R^{17}$ and $R^{18}$ have the same definitions and the same preferable ranges as those of the alkyl group and the aryl group which can be used as $R^S$ in the siloxane structure, respectively. $R^{17}$ and $R^{18}$ may be the same as or different from each other. $R^{19}$ represents an unsubstituted alkyl group having 1 to 4 carbon atoms. y2 represents an integer of 1 to 100, preferably an integer of 1 to 50, and more preferably an integer of 1 to 20.

In Formula 4, x1, x2, and x3 each independently represent an integer of 0 or more.

x1 represents preferably an integer of 0 to 50 and more preferably an integer of 0 to 20.

x2 represents preferably an integer of 0 to 50 and more preferably an integer of 0 to 20.

x3 represents preferably an integer of 1 to 100 and more preferably an integer of 1 to 30.

The sum of x1, x2, and x3 an integer of 1 to 100, preferably an integer of 1 to 70, and more preferably an integer of 1 to 50.

In a case where x1 and x3 each independently represent an integer of 2 or more, two Z's or $R^{15}$'s bonded to the same silicon atom in Formula 4 may be the same or different from each other.

y1 represents an integer of 1 to 30, preferably an integer of 1 to 20, and more preferably an integer of 1 to 10.

Specific examples of the component having a siloxane structure and the component represented by Formula 4 include those described regarding each of the branched polymers synthesized in Example below. However, the present invention is not limited to the examples.

The polymer chain $P^C$ may include a component (referred to as "other component") other than the component having a fluoroalkylene group or a siloxane structure. The other component is not particularly limited as long as it is derived from a polymerizable compound that is copolymerizable with the polymerizable compound derived from the component. Examples of the other component include a component derived from a polymerizable compound having a low molecular weight that has an ethylenically unsaturated group. More specifically, for example, a component derived from each of the compounds described as the polymerizable compound forming the polymer chain $P^C$ can be used, and a component derived from a polymerizable compound selected from (meth)acrylic acid, a (meth)acrylic acid ester compound, a (meth)acrylamide compound, or a (meth) acrylonitrile compound is preferable. As the (meth)acrylic acid ester compound, a (meth)acrylic acid alkyl (preferably, having 1 to 22 carbon atoms) ester compound is preferable. Examples of the polymerizable compound derived from the other component include "vinyl monomer" described in paragraphs "0031" to "0035" of JP2015-088486A and "acrylic monomer" described in paragraphs "0036" to "0042" of JP2015-088486A.

The polymerization degree of all the components in the polymer chain $P^C$ is not particularly limited and is preferably 10 to 10000 and more preferably 20 to 2000.

The content of the component having a fluoroalkylene group or a siloxane structure in the polymer chain $P^C$ is preferably 20 mass % or higher, and from the viewpoints of the dispersibility and binding properties of solid particles and the battery performance of an solid secondary battery, is preferably 40 mass % or higher, more preferably 60 mass % or higher, and still more preferably 80 mass % or higher.

The content of the other component in the polymer chain $P^C$ is not particularly limited and, from the viewpoints of the dispersibility and binding properties of solid particles, is preferably 0% to 80 mass %, more preferably 0% to 40 mass %, and still more preferably 0% to 20 mass %.

As the component having a fluoroalkylene group or a siloxane structure and the other component, components having a SP value of 19.5 or lower (preferably 15.0 to 19.5) are preferable. It is preferable that the polymer chain $P^C$ includes 50 mass % or higher of components having a SP value of 19.5 or lower (preferably 15.0 to 19.5), and it is more preferable that the polymer chain $P^C$ is a polymer chain formed of components having a SP value of 19.5 or lower. In the present invention, the SP value of the component forming the polymer chain $P^C$ may be lower than 19.5.

In the present invention, a value calculated using the Okitsu method is used as the SP value of the component. The Okitsu method is specifically described in, for example, "Journal of the Adhesion Society of Japan", 1993, vol. 29, No. 6, pp. 249 to 259. As the SP value of a component in the present application, a value calculated based on a structure of the component incorporated into the polymer is used.

In addition, the unit of the SP value is not shown but is $MPa^{1/2}$.

In Formula 1, $A^1$ represents an acidic group, a group having a basic nitrogen atom, a urea group, a urethane group, an alkoxysilyl group, an epoxy group, an isocyanate group, or a hydroxyl group. In particular, an acidic group, a group having a basic nitrogen atom, a urea group, or a urethane group is preferable.

The acidic group which can be used as $A^1$ is not particularly limited, and examples thereof include a carboxylate group (—COOH), a sulfonate group (sulfo group: —SO$_3$H), a phosphate group (phospho group: —OPO(OH)$_2$), a phosphonate group, and a phosphinate group.

Examples of the group having a basic nitrogen atom which can be used as $A^1$ include an amino group, a pyridyl group, an imino group, and an amidine.

Preferable examples of the urea group which can be used as $A^1$ include —NR$^{41}$CONR$^{42}$R$^{43}$ (here, R$^{41}$, R$^{42}$, and R$^{43}$ each independently represent a hydrogen atom, an alkyl group having 1 to 20 carbon atoms, an aryl group, or an aralkyl group). As the urea group, —NR$^{41}$CONHR$^{43}$ (here, R$^{41}$ and R$^{43}$ each independently represent a hydrogen atom, an alkyl group having 1 to 10 carbon atoms, an aryl group, or an aralkyl group) is more preferable, and —NHCONHR$^{43}$ (here, R$^{43}$ represents a hydrogen atom, an alkyl group having 1 to 10 carbon atoms, an aryl group, or an aralkyl group) is still more preferable.

Preferable examples of the urethane group which can be used as $A^1$ include a group including at least an imino group and a carbonyl group such as —NHCOR$^{44}$, NR$^{45}$COOR$^{46}$, —OCONNHR$^{47}$, or —OCONR$^{48}$R$^{49}$ (here, RA$^4$, R$^{45}$, R$^{46}$, R$^{47}$, R$^{48}$, and R$^{49}$ represent an alkyl group having 1 to 20 carbon atoms, an aryl group, or an aralkyl group). As the urethane group, —NHCOOR$^{44}$ or —OCONHR$^{47}$ (here, R$^{44}$ and R$^{47}$ represent an alkyl group having 1 to 20 carbon atoms, an aryl group, or an aralkyl group) is more preferable, and —NHCOOR$^{44}$ or —OCONHR$^{47}$ (here, R$^{44}$ and R$^{47}$ represent an alkyl group having 1 to 10 carbon atoms, an aryl group, or an aralkyl group) is still more preferable.

The number of carbon atoms in the aryl group which can be used as R$^{41}$ to R$^{48}$ is preferably 6 or more and is preferably 24 or less. The number of carbon atoms in the aralkyl group which can be used as R$^{41}$ to R$^{48}$ is preferably 7 or more and is preferably 23 or less and more preferably 10 or less.

The alkoxysilyl group which can be used as $A^1$ is not particularly limited, and examples thereof include a mono-, di-, or, tri-alkoxysilyl group. In particular, an alkoxysilyl group having 1 to 20 carbon atoms is preferable, and an alkoxysilyl group having 1 to 6 carbon atoms is more preferable. Examples of the alkoxysilyl group include methoxysilyl, ethoxysilyl, t-butoxysilyl, cyclohexylsilyl, dimethoxysilyl, trimethoxysilyl, and triethoxysilyl.

$A^1$ interacts with the solid particles such that binding properties between solid particles exhibited by the branched polymer can be further reinforced. The interaction is not particularly limited, and examples thereof include an interaction by a hydrogen bond, an interaction by an acid-base ionic bond, an interaction by a covalent bond, a π-π interaction by an aromatic ring, and a hydrophobic-hydrophobic interaction. The solid particles and the branched polymer adsorb to each other due to one or two or more among the above-described interactions depending on the kind of the group which can be used as $A^1$ and the kind of the above-described solid particles.

In a case where the group which can be used as $A^1$ interacts, the chemical structure of the group which can be used as $A^1$ may or may not change. For example, in the above-described π-π interaction or the like, typically, the group which can be used as $A^1$ maintains the structure thereof without a change. On the other hand, in the interaction by a covalent bond or the like, typically, the functional group is converted into an anion (the group which can be used as $A^1$ changes) by desorption of active hydrogen such as a carboxylate group and is bound to the solid particles.

An acidic group, a hydroxyl group, or an alkoxysilyl group is suitably adsorbed to the positive electrode active material and the inorganic solid electrolyte. Among these, a carboxylate group is more preferable.

A group having a basic nitrogen atom is suitably adsorbed to a conductive auxiliary agent.

In Formula 1, p represents an integer of 1 to 10, preferably an integer of 1 to 5, more preferably an integer of 1 to 3, and still more preferably 1 or 2.

In Formula 1, m represents an integer of 1 to 8, preferably an integer of 1 to 4, more preferably an integer of 1 to 3, and still more preferably 1 or 2.

n represents an integer of 2 to 9, preferably an integer of 2 to 5, and more preferably an integer of 3 to 5.

m+n represents an integer of 3 to 10, preferably an integer of 3 to 8, more preferably an integer of 3 to 6, and still more preferably an integer of 4 to 6.

As the polymer represented by Formula 1, a commercially available product can be used. However, the polymer can be synthesized, for example, by using a surfactant, an emulsifier or dispersant, the polymerizable compound forming the polymer chain $P^C$, a polymerizable compound that can form a partial structure including $A^1$ and $R^2$, a copolymerizable compound, and the like and performing an addition reaction of the polymerizable compound forming the polymer chain $P^C$, the polymerizable compound that can form a partial structure including $A^1$ and $R^2$ and the like with a polyvalent thiol compound such that the partial structure including $A^1$ and the polymer chain $P^C$ are introduced into the polyvalent thiol compound. In addition to the addition reaction, a polymerization reaction (radical polymerization) can also be performed using the polymerizable compound that can form a partial structure including $A^1$ and $R^2$ or the polymerizable compound forming the polymer chain $P^C$, according to a typical polymerization reaction or the like.

During the synthesis of the polymer represented by Formula 1, a step of causing the polymerizable compound that can form a partial structure including $A^1$ and $R^2$ to react with the polyvalent thiol compound and a step of introducing the polymer chain $P^C$ into the polyvalent thiol compound can be performed simultaneously or separately. In this case, the reaction rate of each of the polymerizable compounds to all the mercapto groups in the polyvalent thiol compound is set such that m and n in Formula 1 are satisfied in the step of causing the polymerizable compound that can form a partial structure including $A^1$ and $R^2$ to react and the step of introducing the polymer chain $P^C$.

It is preferable that the polymer represented by Formula 1 is a reactant of a compound represented by Formula 2 described below and the polymerizable compound forming the polymer chain $P^C$.

A solvent used for the synthesis of the polymer is not particularly limited. It is preferable that a solvent that is not reactive with and does not decompose the inorganic solid electrolyte or the active material is used. For example, a hydrocarbon solvent (toluene, heptane, or xylene), an ester solvent (ethyl acetate, propylene glycol monomethyl ether acetate, butyl butyrate), an ether solvent (tetrahydrofuran, dioxane, or 1,2-diethoxyethane), a ketone solvent (acetone, methyl ethyl ketone, cyclohexanone, diisobutyl ketone), a nitrile solvent (acetonitrile, propionitrile, butyronitrile, or isobutyronitrile), or a halogen solvent (dichloromethane or chloroform) can be used.

It is preferable that the polymer represented by Formula 1 can be obtained by causing the compound represented by Formula 2 described below and the polymerizable compound forming the polymer chain $P^C$ to react (addition reaction and polymerization reaction) with each other.

Reaction conditions (polymerization conditions) are set to conditions for an addition reaction (thiol-ene reaction) or a polymerization reaction of the compound represented by the following Formula 2 and the polymerizable compound forming the polymer chain $P^2$ or conditions for a polymerization reaction of the polymerizable compound forming the polymer chain $P^C$. The conditions are appropriately set according to the kind of the compound represented by Formula 2 or the polymerizable compound, the kind or amount of a catalyst to be used, and the like. Examples of the conditions include conditions where the reaction is performed using the above-described solvent at a reaction temperature of 50° C. to 150° C. for 1 to 15 hours. In this reaction, a typically used polymerization catalyst such as an azo compound or an organic peroxide can be used without any particular limitation.

In this polymerization method, the polymerizable compounds used for the polymerization reaction can be caused to react with high efficiency (conversion rate), the residual amount of an unreacted material can be reduced, and a high-purity polymer can be synthesized.

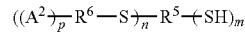

(Formula 2)

In Formula 2, $R^5$ represents a (m+n)-valent linking group and has the same definition and the same preferable range as those of $R^1$ in Formula 1. $R^6$ represents a single bond or a linking group and has the same definition and the same preferable range as those of $R^2$ in Formula 1. $A^2$ represents an acidic group, a group having a basic nitrogen atom, a urea group, a urethane group, an alkoxysilyl group, an epoxy group, an isocyanate group, or a hydroxyl group, and has the same definition and the same preferable range as those of $A^1$ in Formula 1. p represents an integer of 1 to 10, and has the same definition and the same preferable range as those of p in Formula 1.

In Formula 2, m represents an integer of 1 to 8, and n represents an integer of 2 to 9. m+n represents an integer of 3 to 10. In Formula 2, m, n, and m+n have the same definitions and the same preferable ranges as those of m, n, and m+n in Formula 1, respectively.

The compound represented by Formula 2 is not particularly limited and can be synthesized, for example, by performing an addition reaction (ene-thiol reaction) of the polymerizable compound that can form a partial structure including $A^2$ and $R^6$ with the (m+n)-valent thiol compound. Synthesis conditions are not particularly limited and, for example, are the same as the conditions of the reaction of the compound represented by Formula 2 and the polymerizable compound forming the polymer chain $P^C$. Examples of the polymerizable compound that can form the partial structure including $A^2$ and $R^6$ include a polymerizable compound that has one or more ethylenically unsaturated groups at a terminal or a side chain of the molecular structure and includes $A^2$, for example, the polymerizable compound having the group $A^1$ among the polymerizable compounds forming the polymer chain $P^C$.

The content of the polymer represented by Formula 1 in the solid electrolyte composition is preferably 0.1 mass % or higher, more preferably 0.2 mass % or higher, and still more preferably 0.3 mass % or higher with respect to the solid content of the solid electrolyte composition. The upper limit is more preferably 30 mass % or lower, more preferably 20 mass % or lower, still more preferably 10 mass % or lower, and still more preferably 3 mass % or lower.

By using the polymer represented by Formula 1 in the above-described range, binding properties between solid particles can be improved more effectively, and an increase in the interface resistance of solid particles can be suppressed.

<Dispersion Medium>

It is preferable that the solid electrolyte composition according to the embodiment of the present invention includes a dispersion medium.

The dispersion medium is not particularly limited as long as it can disperse or dissolve the above-described respective components. It is preferable that the dispersion medium dissolves the polymer represented by Formula 1 and disperse solid particles. Examples of the dispersion medium in the solid electrolyte composition include various organic solvents. Examples of the organic solvent include the respective solvents of an alcohol compound, an ether compound, an amide compound, an amine compound, a ketone compound, an aromatic compound, an aliphatic compound, a nitrile compound, and an ester compound. Specific examples of the dispersion medium are as follows.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound include an alkylene glycol (for example, diethylene glycol, triethylene glycol, polyethylene glycol, or dipropylene glycol), an alkylene glycol alkyl ether (for example, ethylene glycol monomethyl ether, ethylene glycol monobutyl ether, propylene glycol monomethyl ether, diethylene glycol monomethyl ether, dipropylene glycol monomethyl ether, tripropylene glycol monomethyl ether, or diethylene glycol monobutyl ether), a dialkyl ether (for example, dimethyl ether, diethyl ether, diisopropyl ether, or dibutyl ether), and a cyclic ether (for example, tetrahydrofuran or dioxane (including respective isomers of 1,2-, 1,3-, and 1,4-)).

Examples of the amide compound include N,N-dimethylformamide, N-methyl-2-pyrrolidone, 2-pyrrolidinone, 1,3-dimethyl-2-imidazolidinone, c-caprolactam, formamide, N-methylformamide, acetamide, N-methylacetamide, N,N-dimethylacetamide, N-methylpropanamide, and hexamethylphosphoric triamide.

Examples of the amine compound include triethylamine, diisopropylethylamine, and tributylamine.

Examples of the ketone compound include acetone, methyl ethyl ketone, methyl isobutyl ketone, cyclohexanone, and diisobutyl ketone.

Examples of the aromatic compound include benzene, toluene, and xylene.

Examples of the aliphatic compound include hexane, heptane, octane, and decane.

Examples of the nitrile compound include acetonitrile, propionitrile, and isobutyronitrile.

Examples of the ester compound include ethyl acetate, butyl acetate, propyl acetate, butyl butyrate, and butyl pentanoate.

Examples of a non-aqueous dispersion medium include the aromatic compound and the aliphatic compound described above.

In the present invention, in particular, a ketone compound, an aromatic compound, an aliphatic compound, or an ester compound is preferable, and a ketone compound, an aliphatic compound, or an ester compound is more preferable. In the present invention, it is preferable that the sulfide-based inorganic solid electrolyte is used and the above-described specific organic solvent is selected. By selecting this combination, a functional group that is active with the sulfide-based inorganic solid electrolyte is not included, and thus the sulfide-based inorganic solid electrolyte can be stably handled. In particular, a combination of the sulfide-based inorganic solid electrolyte and the aliphatic compound is preferable.

The boiling point of the dispersion medium under normal pressure (1 atm) is preferably 50° C. or higher and more preferably 70° C. or higher. The upper limit is more preferably 250° C. or lower and still more preferably 220° C. or lower.

As the dispersion medium, one kind may be included alone, or two or more kinds may be included in combination.

In the present invention, the content of the dispersion medium in the solid electrolyte composition is not particularly limited and can be appropriately set. For example, the content of the dispersion medium in the solid electrolyte composition is preferably 20% to 99 mass %, more preferably 25% to 70 mass %, and still more preferably 30% to 60 mass %.

<Active Material>

The solid electrolyte composition according to the embodiment of the present invention may also include an active material capable of intercalating and deintercalating ions of a metal belonging to Group 1 or Group 2 in the periodic table. Although described below, examples of the active material include a positive electrode active material and a negative electrode active material.

In the present invention, the solid electrolyte composition including the active material (the positive electrode active material or the negative electrode active material) will be referred to as an electrode composition (a positive electrode layer composition or a negative electrode layer composition).

(Positive Electrode Active Material)

The positive electrode active material is preferably capable of reversibly intercalating and/or deintercalating lithium ions. The above-described material is not particularly limited as long as the material has the above-described characteristics and may be transition metal oxides, elements capable of being complexed with Li such as sulfur, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon type vanadium phosphate salt such as $Li_3V_2(PO_4)_3$ (lithium vanadium phosphate).

Examples of the lithium-containing transition metal halogenated phosphate compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxides having a layered rock salt structure (MA) is preferable, and LCO or NMC is more preferable.

The shape of the positive electrode active material is not particularly limited, but is preferably a particle shape. The volume average particle size (sphere-equivalent average particle size) of the positive electrode active material is not particularly limited. For example, the volume average particle size can be set to 0.1 to 50 µm. The average particle size of the positive electrode active material particles can be measured using the same method as that of the average particle size of the inorganic solid electrolyte. In order to allow the positive electrode active material to have a predetermined particle size, an ordinary pulverizer or classifier may be used. For example, a mortar, a ball mill, a sand mill, a vibration ball mill, a satellite ball mill, a planetary ball mill, a swirling air flow jet mill, or a sieve is preferably used. During the pulverization, wet pulverization of causing water or an organic solvent such as methanol to coexist with the negative electrode active material can be performed. In order to obtain a desired particle size, it is preferable to perform classification. Classification is not particularly limited and can be performed using, for example, a sieve or an air classifier. The classification can be used using a dry method or a wet method.

Positive electrode active materials obtained using a calcination method may be used after being washed with water, an acidic aqueous solution, an alkaline aqueous solution, or an organic solvent.

As the positive electrode active material, one kind may be used alone, or two or more kinds may be used in combination.

In the case of forming a positive electrode active material layer, the mass (mg) of the positive electrode active material per unit area ($cm^2$) of the positive electrode active material layer (weight per unit area) is not particularly limited. The mass (mg) of the inorganic solid electrolyte can be appropriately determined depending on the designed battery capacity and may be, for example, 1 to 100 $mg/cm^2$.

The content of the positive electrode active material in the solid electrolyte composition is not particularly limited, but is preferably 10% to 97 mass %, more preferably 30% to 95 mass %, still more preferably 40% to 93 mass %, and particularly preferably 50% to 90 mass % with respect to a solid content of 100 mass %.

(Negative Electrode Active Material)

The negative electrode active material is preferably capable of reversibly intercalating and deintercalating lithium ions. The material is not particularly limited as long as it has the above-described properties, and examples thereof include a carbonaceous material, a metal oxide, a metal composite oxide, elemental lithium, a lithium alloy, and a negative electrode active material capable of forming an alloy with lithium. Among these, a carbonaceous material, a metal composite oxide, or lithium is preferably used from the viewpoint of reliability.

The carbonaceous material which is used as the negative electrode active material is a material substantially consisting of carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into hardly graphitizable carbonaceous materials (also referred to as "hard carbon") and graphitizable carbonaceous materials based on the graphitization degree. In addition, it is preferable that the carbonaceous material has the lattice spacing, density, and crystallite size described in JP1987-022066A (JP-$S_{62}$-022066A), JP1990-006856A (JP-H2-006856A), and JP1991-045473A (JP-H3-045473A). The carbonaceous material is not necessarily a single material and, for example, may be a mixture of natural graphite and artificial graphite described in JP1993-090844A (JP-H5-090844A) or graphite having a coating layer described in JP1994-004516A (JP-H6-004516A).

As the carbonaceous material, hard carbon or graphite is preferably used, and graphite is more preferably used.

The oxide of a metal or a metalloid element that can be used as the negative electrode active material is not particularly limited as long as it is an oxide capable of intercalating and deintercalating lithium, and examples thereof include an oxide of a metal element (metal oxide), a composite oxide of a metal element or a composite oxide of a metal element and a metalloid element (collectively referred to as "metal composite oxide), and an oxide of a metalloid element (metalloid oxide). The oxides are more preferably amorphous oxides, and preferable examples thereof include chalcogenides which are reaction products between metal elements and elements in Group 16 of the periodic table). In the present invention, the metalloid element refers to an element having intermediate properties between those of a metal element and a non-metal element. Typically, the metalloid elements include six elements including boron, silicon, germanium, arsenic, antimony, and tellurium and further includes three elements including selenium, polonium, and astatine. In addition, "Amorphous" represents an oxide having a broad scattering band with a peak in a range of 20° to 40° in terms of 2θ in case of being measured by an X-ray diffraction method using CuKα rays, and the oxide may have a crystal diffraction line. The highest intensity in a crystal diffraction line observed in a range of 40° to 70° in terms of 2θ is preferably 100 times or less and more preferably 5 times or less relative to the intensity of a diffraction peak line in a broad scattering band observed in a range of 20° to 40° in terms of 2θ, and it is still more preferable that the oxide does not have a crystal diffraction line.

In a compound group consisting of the amorphous oxides and the chalcogenides, amorphous oxides of metalloid elements and chalcogenides are more preferable, and (composite) oxides consisting of one element or a combination of two or more elements selected from elements (for example, Al, Ga, Si, Sn, Ge, Pb, Sb, and Bi) belonging to Groups 13 (IIIB) to 15 (VB) in the periodic table or chalcogenides are still more preferable. Specific examples of preferred amorphous oxides and chalcogenides include $Ga_2O_3$, $GeO$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, $GeS$, $PbS$, $PbS_2$, $Sb_2S_3$, and $Sb_2S_5$.

Preferable examples of the negative electrode active material which can be used in combination with the amorphous oxide containing Sn, Si, or Ge as a major component include carbonaceous materials that can intercalate and/or deintercalate lithium ions or lithium metal; elemental lithium; lithium alloys; and an active material that can form an alloy with lithium.

It is preferable that the oxide of a metal or a metalloid element, in particular, the metal (composite) oxide and the chalcogenide include at least one of titanium or lithium as components from the viewpoint of high current density charging-discharging characteristics. Examples of the metal composite oxide (lithium composite metal oxide) including lithium include a composite oxide consisting of lithium oxide and the metal (composite) oxide or the chalcogenide, specifically, $Li_9SnO_2$.

As the negative electrode active material, for example, a metal oxide (titanium oxide) having a titanium atom is also preferable. Specifically, $Li_4Ti_5O_{12}$ (lithium titanium oxide [LTO]) is preferable since the volume fluctuation during the intercalation and deintercalation of lithium ions is small, and thus the high-speed charging-discharging characteristics are excellent, and the deterioration of electrodes is suppressed, whereby it becomes possible to improve the service lives of lithium ion secondary batteries.

The lithium alloy as the negative electrode active material is not particularly limited as long as it is typically used as a negative electrode active material for a secondary battery, and examples thereof include a lithium aluminum alloy.

The active material capable of forming an alloy with lithium is not particularly limited as long as it is typically used as a negative electrode active material for a secondary battery. This active material has large expansion and contraction during charging and discharging of the all-solid state secondary battery and accelerates deterioration in cycle characteristics. However, the inorganic solid electrolyte-containing composition according to the embodiment of the present invention includes the above-described branched polymer, and thus can suppress deterioration in cycle characteristics. Examples of the active material include a (negative electrode) active material (for example, an alloy) having silicon element or tin element and a metal such as Al or In. A negative electrode active material (silicon-containing active material) including a silicon element capable of exhibiting high battery capacity is preferable, and a silicon-containing active material including 50 mol % or higher of silicon element with respect to all the constituent elements is more preferable.

In general, a negative electrode including the negative electrode active material (for example, a Si negative electrode including a silicon-containing active material or an Sn negative electrode including tin element) can intercalate a larger amount of Li ions than a carbon negative electrode (for example, graphite or acetylene black). That is, the amount of Li ions intercalated per unit mass increases. Therefore, it is possible to increase the battery capacity. As a result, there is an advantage that the battery driving duration can be extended.

Examples of the silicon-containing active material include a silicon-containing alloy (for example, $LaSi_2$, $VSi_2$, La—Si, Gd—Si, or Ni—Si) including a silicon material such as Si or SiOx (0<x≤1) and titanium, vanadium, chromium, manganese, nickel, copper, lanthanum, or the like or a structured active material thereof (for example, $LaSi_2$/Si), and an active material such as $SnSiO_3$ or $SnSiS_3$ including silicon element and tin element. SiOx itself can be used as the negative electrode active material (metalloid oxide). In addition, Si is produced along with the operation of an all-solid state secondary battery, and thus SiO can be used as a negative electrode active material (or a precursor thereof) capable of forming an alloy with lithium.

Examples of the negative electrode active material including tin element include Sn, SnO, $SnO_2$, SnS, $SnS_2$, and the above-described active material including silicon element and tin element. In addition, a composite oxide with lithium oxide, for example, $Li_2SnO_2$ can also be used.

In the present invention, the above-described negative electrode active material can be used without any particular limitation. From the viewpoint of battery capacity, as the negative electrode active material, a negative electrode active material capable of forming an alloy with lithium is preferable, the above-described silicon material or an silicon-containing alloy (an alloy including silicon element) is more preferable, and a negative electrode active material including silicon (Si) or an silicon-containing alloy is still more preferable.

The chemical formulae of the compounds obtained using a calcination method can be calculated using inductively coupled plasma (ICP) optical emission spectroscopy as a measurement method from the mass difference of powder before and after calcinating as a convenient method.

The shape of the negative electrode active material is not particularly limited, but is preferably a particle shape. The volume average particle size of the negative electrode active material is not particularly limited is preferably 0.1 to 60 μm. The volume average particle size of the negative electrode active material particles can be measured using the same method as that of the average particle size of the inorganic solid electrolyte. In order to allow the negative electrode active material to have a predetermined particle size, an ordinary pulverizer or classifier may be used as in the positive electrode active material.

As the negative electrode active material, one kind may be used alone, or two or more kinds may be used in combination.

In the case of forming a negative electrode active material layer, the mass (mg) of the negative electrode active material per unit area ($cm^2$) in the negative electrode active material layer (weight per unit area) is not particularly limited. The mass (mg) of the inorganic solid electrolyte can be appropriately determined depending on the designed battery capacity and may be, for example, 1 to 100 mg/$cm^2$.

The content of the negative electrode active material in the solid electrolyte composition is not particularly limited and is preferably 10% to 90 mass %, more preferably 20% to 85 mass %, still more preferably 30% to 80 mass %, and still more preferably 40% to 75 mass % with respect to 100 mass % of the solid content.

In the present invention, in a case where a negative electrode active material layer is formed by charging a secondary battery, ions of a metal belonging to Group 1 or Group 2 in the periodic table produced in the all-solid state secondary battery can be used instead of the negative electrode active material. By bonding the ions to electrons and precipitating a metal, a negative electrode active material layer can be formed.

(Coating of Active Material)

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an actinic ray or an active gas (plasma or the like) before or after the coating of the surfaces.

<Conductive Auxiliary Agent>

The solid electrolyte composition according to the embodiment of the present invention may appropriately include a conductive auxiliary agent used for improving, for example, the electron conductivity of the active material. As the conductive auxiliary agent, a general conductive auxiliary agent can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, among these, one kind may be used, or two or more kinds may be used. The shape of the conductive auxiliary agent is not particularly limited, but is preferably a particle shape.

In a case where the solid electrolyte composition according to the embodiment of the present invention includes a conductive auxiliary agent, the content of the conductive auxiliary agent is preferably 0% to 10 mass % with respect to 100 mass % of the solid content.

In the present invention, in a case where the active material and the conductive auxiliary agent are used in combination, among the above-described conductive auxiliary agents, a conductive auxiliary agent that does not intercalate and deintercalate ions (preferably Li ions) of a metal belonging to Group 1 or Group 2 in the periodic table and does not function as an active material during charging and discharging of the battery is classified as the conductive auxiliary agent. Therefore, among the conductive auxiliary agents, a conductive auxiliary agent that can function as the active material in the active material layer during charging and discharging of the battery is classified as an active material not as a conductive auxiliary agent. Whether or not the conductive auxiliary agent functions as the active material during charging and discharging of the battery is not uniquely determined but is determined based on a combination of the conductive auxiliary agent with the active material.

<Lithium Salt>

It is also preferable that the solid electrolyte composition according to the embodiment of the present invention includes a lithium salt (supporting electrolyte).

The lithium salt is preferably a lithium salt typically used for this kind of product and is not particularly limited. For example, a lithium salt described in paragraphs "0082" to "0085" of JP2015-088486A is preferable.

In a case where the solid electrolyte composition according to the embodiment of the present invention includes a lithium salt, the content of the lithium salt is preferably 0.1 parts by mass or more and more preferably 5 parts by mass or more with respect to 100 parts by mass of the solid electrolyte. The upper limit is preferably 50 parts by mass or less and more preferably 20 parts by mass or less.

<Dispersant>

In the solid electrolyte composition according to the embodiment of the present invention, the polymer represented by Formula 1 also functions as a dispersant. Therefore, the solid electrolyte composition according to the embodiment of the present invention may not include a dispersant other than the polymer and may include a dispersant. As the dispersant, a dispersant that is generally used for an all-solid state secondary battery can be appropriately selected and used. Generally, a compound intended for particle adsorption and steric repulsion and/or electrostatic repulsion is preferably used.

<Other Additives>

As components other than the respective components described above, the solid electrolyte composition according to the embodiment of the present invention may optionally include an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant. The ionic liquid is added to improved the ion conductivity, and a well-known material can be used without any particular limitation. In addition, the solid electrolyte composition may include a polymer other than the polymer represented by Formula 1 and a binder that is typically used.
(Preparation of Solid Electrolyte Composition)

The solid electrolyte composition according to the embodiment of the present invention can be prepared as a mixture, preferably, as a slurry by mixing the inorganic solid electrolyte, the polymer represented by Formula 1 (preferably the dispersion medium) and further other optional components, for example using various mixers that are typically used.

A mixing method is not particularly limited, and the components may be mixed at once or sequentially. A mixing environment is not particularly limited, and examples thereof include a dry air environment and an inert gas environment.

In the active material layer-forming composition according to the embodiment of the present invention, reaggregation of solid particles can be suppressed, and a dispersion liquid including highly dispersed solid particles can be obtained.

[Sheet for All-Solid State Secondary Battery]

A sheet for an all-solid state secondary battery according to the embodiment of the present invention is a sheet-shaped molded body with which a constituent layer of an all-solid state secondary battery can be formed, and includes various aspects depending on uses thereof. Examples of the sheet for an all-solid state secondary battery include a sheet that is preferably used in a solid electrolyte layer (also referred to as a solid electrolyte sheet for an all-solid state secondary battery), and a sheet that is preferably used in an electrode or a laminate of an electrode and a solid electrolyte layer (an electrode sheet for an all-solid state secondary battery). In the present invention, these various sheets will also be collectively referred to as a sheet for an all-solid state secondary battery.

The solid electrolyte sheet for an all-solid state secondary battery according to the embodiment of the present invention is not particularly limited as long as it is a sheet including a solid electrolyte layer, and may be a sheet in which a solid electrolyte layer is formed on a substrate or may be a sheet that is formed of a solid electrolyte layer without including a substrate. The solid electrolyte sheet for an all-solid state secondary battery may include other layers in addition to the solid electrolyte layer. Examples of the other layers include a protective layer (release sheet), a current collector, and a coating layer. Examples of the solid electrolyte sheet for an all-solid state secondary battery according to the embodiment of the present invention include a sheet including a layer formed of the solid electrolyte composition according to the embodiment of the present invention, a typical solid electrolyte layer, and a protective layer on a substrate in this order.

The substrate is not particularly limited as long as it can support the solid electrolyte layer, and examples thereof include a sheet body (plate-shaped body) formed of materials described below regarding the current collector, an organic material, an inorganic material, or the like. Examples of the organic materials include various polymers, and specific examples thereof include polyethylene terephthalate, polypropylene, polyethylene, and cellulose. Examples of the inorganic materials include glass and ceramic.

The configuration and thickness of the solid electrolyte layer in the sheet for an all-solid state secondary battery are the same as the configuration and thickness of the solid electrolyte layer described below regarding the all-solid state secondary battery according to the embodiment of the present invention. It is preferable that the solid electrolyte layer in the solid electrolyte sheet for an all-solid state secondary battery is formed of the solid electrolyte composition according to the embodiment of the present invention. The contents of the respective components in the solid electrolyte layer are not particularly limited, but are preferably the same as the contents of the respective components with respect to the solid content of the solid electrolyte composition according to the embodiment of the present invention.

An electrode sheet for an all-solid state secondary battery according to the embodiment of the present invention (simply also referred to as "electrode sheet according to the embodiment of the present invention") is not particularly limited as long as it is an electrode sheet including an active material layer, and may be a sheet in which an active material layer is formed on a substrate (current collector) or may be a sheet that is formed of an active material layer without including a substrate. The electrode sheet is typically a sheet including the current collector and the active material layer, and examples of an aspect thereof include an aspect including the current collector, the active material layer, and the solid electrolyte layer in this order and an aspect including the current collector, the active material layer, the solid electrolyte layer, and the active material layer in this order. The electrode sheet according to the embodiment of the present invention may include the above-described other layers. The thickness of each of the layers forming the electrode sheet according to the embodiment of the present invention is the same as the thickness of each of layers described below regarding the all-solid state secondary battery. The contents of the respective components in the active material layer of the electrode sheet are not particularly limited, but are preferably the same as the contents of the respective components with respect to the solid content of the solid electrolyte composition (electrode composition) according to the embodiment of the present invention.

In the sheet for an all-solid state secondary battery according to the embodiment of the present invention, at least one of the solid electrolyte layer or the active material layer is formed of the solid electrolyte composition according to the embodiment of the present invention, solid particles in the layer are strongly bound to each other. In addition, in the electrode sheet for an all-solid state secondary battery, the active material layer that is formed of the solid electrolyte composition according to the embodiment of the present invention is strongly bound to the current collector. In the present invention, an increase in the interface resistance of solid particles can also be effectively suppressed. Accordingly, the sheet for an all-solid state secondary battery according to the embodiment of the present invention can be suitably used as a sheet with which a constituent layer of an all-solid state secondary battery can be formed.

In a case where an all-solid state secondary battery is manufactured using the sheet for an all-solid state secondary battery according to the embodiment of the present invention, excellent battery performance can be exhibited, and high productivity and yield (reproducibility) can be realized.

[Method of Manufacturing Sheet for All-Solid State Secondary Battery]

A method of manufacturing a sheet for an all-solid state secondary battery according to the embodiment of the present invention is not particularly limited. The sheet for an all-solid state secondary battery according to the embodiment of the present invention can be manufactured by forming the respective layers using the solid electrolyte composition according to the embodiment of the present invention. Examples of the method include a method of forming a film (drying and applying) to form a layer (applied and dried layer) formed of the solid electrolyte composition preferably on a substrate or a current collector (other layers may be interposed therebetween). As a result, the sheet for an all-solid state secondary battery including the substrate or the current collector and the applied and dried layer can be prepared. Here, the applied and dried layer refers to a layer formed by applying the solid electrolyte composition according to the embodiment of the present invention and drying the dispersion medium (that is, a layer formed using the solid electrolyte composition according to the embodiment of the present invention and made of a composition obtained by removing the dispersion medium from the solid electrolyte composition according to the embodiment of the present invention).

Each of steps of application, drying, or the like in the method of manufacturing a sheet for an all-solid state secondary battery according to the embodiment of the present invention will be described below regarding a method of manufacturing an all-solid state secondary battery.

In the method of manufacturing a sheet for an all-solid state secondary battery according to the embodiment of the present invention, it is also possible to compress the applied and dried layer obtained as described above. Compression conditions or the like will be described below regarding the method of manufacturing an all-solid state secondary battery.

In addition, in the method of manufacturing a sheet for an all-solid state secondary battery according to the embodiment of the present invention, it is also possible to peel the substrate, the protective layer (particularly, the release sheet), or the like.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The positive electrode active material layer is formed preferably on a positive electrode current collector to configure a positive electrode. The negative electrode active material layer is formed preferably on a negative electrode current collector to configure a negative electrode.

It is preferable that at least one of the negative electrode active material layer, the positive electrode active material layer, or the solid electrolyte layer is formed of the solid electrolyte composition according to the embodiment of the present invention, and it is more preferable that all the layers are formed of the solid electrolyte composition according to the embodiment of the present invention. In the active material layer or the solid electrolyte layer formed of the solid electrolyte composition according to the embodiment of the present invention, it is preferable that the kinds of components to be included and the content ratio thereof are the same as those of the solid content of the solid electrolyte composition according to the embodiment of the present invention. In a case where the active material layer or the solid electrolyte layer is not formed of the solid electrolyte composition according to the embodiment of the present invention, a well-known material can be used.

The thicknesses of the negative electrode active material layer, the solid electrolyte layer, and the positive electrode active material layer are not particularly limited respectively. In consideration of the dimension of a general all-solid state secondary battery, each of the thicknesses of the layers is preferably 10 to 1,000 μm and more preferably 20 μm or more and less than 500 μm. In the all-solid state secondary battery according to the embodiment of the present invention, the thickness of at least one layer of the positive electrode active material layer or the negative electrode active material layer is still more preferably 50 μm or more and less than 500 μm.

Each of the positive electrode active material layer and the negative electrode active material layer may include the current collector opposite to the solid electrolyte layer.

[Case]

Depending on uses, the all-solid state secondary battery according to the embodiment of the present invention may be used as the all-solid state secondary battery having the above-described structure as it is but is preferably sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short-circuit prevention.

Hereinafter, an all-solid state secondary battery according to a preferred embodiment of the present invention will be described with reference to FIG. 1, but the present invention is not limited thereto.

FIG. 1 is a cross-sectional view schematically illustrating the all-solid state secondary battery (lithium ion secondary battery) according to the preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers are in contact with one another and adjacent to each other. In a case in which the above-described structure is adopted, during charging, electrons ($e^-$) are supplied to the negative electrode side, and lithium ions ($Li^+$) are accumulated in the negative electrode side. On the other hand, during discharging, the lithium ions ($Li^+$) accumulated in the negative electrode side return to the positive electrode, and electrons are supplied to an operation portion 6. In an example shown in the drawing, an electric bulb is adopted as a model of the operation portion 6 and is lit by discharging.

In a case where the all-solid state secondary battery having a layer configuration illustrated in FIG. 1 is put into a 2032-type coin case, the all-solid state secondary battery will be referred to as "electrode sheet for an all-solid state secondary battery", and a battery prepared by putting this electrode sheet for an all-solid state secondary battery into a 2032-type coin case will be referred to as "all-solid state secondary battery", thereby referring to both batteries distinctively in some cases.

(Positive Electrode Active Material Layer, Solid Electrolyte Layer, and Negative Electrode Active Material Layer)

In the all-solid state secondary battery 10, all of the positive electrode active material layer, the solid electrolyte layer, and the negative electrode active material layer are formed using the solid electrolyte composition according to the embodiment of the present invention. This all-solid state secondary battery 10 exhibits excellent battery performance. The inorganic solid electrolytes and the branched polymers in the positive electrode active material layer 4, the solid electrolyte layer 3, and the negative electrode active material layer 2 may be the same as or different from each other, respectively.

In the present invention, either or both of the positive electrode active material layer and the negative electrode active material layer will also be simply referred to as the active material layer or the electrode active material layer. In addition, either or both of the positive electrode active material and the negative electrode active material will also be simply referred to as "active material" or "electrode active material".

In the present invention, in a case where the above-described polymer represented by Formula 1 are used in combination with the solid particles such as the inorganic solid electrolyte or the active material, as described above, binding properties between solid particles can be improved, and poor contact between the solid particles and peeling of the solid particles from the current collector can be suppressed. Further, an increase in interface resistance between the solid particles an increase in interface resistance between the solid particles and the current collector can also be suppressed. Therefore, the all-solid state secondary battery according to the embodiment of the present invention exhibits excellent battery performance.

In the all-solid state secondary battery 10, the negative electrode active material layer can be formed as a lithium metal layer. Examples of the lithium metal layer include a layer formed by deposition or forming of lithium metal powder, a lithium foil, and a lithium deposited film. The thickness of the lithium metal layer is not limited to the above-described thickness of the above-described negative electrode active material layer and may be, for example, 1 to 500 μm.

The positive electrode current collector 5 and the negative electrode current collector 1 are preferably an electron conductor.

In the present invention, either or both of the positive electrode current collector and the negative electrode current collector will also be simply referred to as the current collector.

As a material for forming the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material for forming the negative electrode current collector, not only aluminum, copper, a copper alloy, stainless steel, nickel, or titanium but also a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, typically, current collectors having a film sheet shape are used, but it is also possible to use net-shaped collectors, punched collectors, compacts of lath bodies, porous bodies, foaming bodies, or fiber groups, and the like.

The thickness of the current collector is not particularly limited, but is preferably 1 to 500 μm. In addition, it is also preferable that the surface of the current collector is made to be uneven through a surface treatment.

In the present invention, a functional layer, a member, or the like may be appropriately interposed or disposed between the respective layers of the negative electrode current collector, the negative electrode active material layer, the solid electrolyte layer, the positive electrode active material layer, and the positive electrode current collector or on the outside thereof. In addition, each of the layers may have a single-layer structure or a multi-layer structure.

[Manufacturing of All-Solid State Secondary Battery]

The all-solid state secondary battery can be manufactured using an ordinary method. Specifically, the all-solid state secondary battery can be manufactured by forming the respective layers using the solid electrolyte composition according to the embodiment of the present invention and the like. As a result, an all-solid state secondary battery having excellent battery performance and having a low electrical resistance can be manufactured. Hereinafter, the details will be described in detail.

The all-solid state secondary battery according to the embodiment of the present invention can be manufactured through a method (the method of manufacturing a sheet for an all-solid state secondary battery according to the embodiment of the present invention) including (through) a step of appropriately applying (film formation) the solid electrolyte composition according to the embodiment of the present invention to the substrate (for example, the metal foil as the current collector) to form a coating film.

For example, the solid electrolyte composition including the positive electrode active material is applied as a positive electrode material (positive electrode layer composition) to a metal foil which is a positive electrode current collector so as to form a positive electrode active material layer. As a result, a positive electrode sheet for an all-solid state secondary battery is prepared. Next, the solid electrolyte composition for forming a solid electrolyte layer is applied to the positive electrode active material layer so as to form the solid electrolyte layer. Further, the solid electrolyte composition including the negative electrode active material is applied as a negative electrode material (negative electrode layer composition) to the solid electrolyte layer so as to form a negative electrode active material layer. By laminating the negative electrode current collector (metal foil) on the negative electrode active material layer, an all-solid state secondary battery having a structure in which the solid electrolyte layer is sandwiched between the positive electrode active material layer and the negative electrode active material layer can be obtained. By sealing the laminate in a case, a desired all-solid state secondary battery can also be obtained.

In addition, an all-solid state secondary battery can also be manufactured by forming the negative electrode active material layer, the solid electrolyte layer, and the positive electrode active material layer on the negative electrode current collector in order reverse to that of the method of forming the respective layers and laminating the positive electrode current collector thereon.

As another method, for example, the following method can be used. That is, the positive electrode sheet for an all-solid state secondary battery is prepared as described above. In addition, the solid electrolyte composition including the negative electrode active material is applied as a negative electrode material (negative electrode layer composition) to a metal foil which is a negative electrode current collector so as to form a negative electrode active material layer. As a result, a negative electrode sheet for an all-solid state secondary battery is prepared. Next, the solid electrolyte layer is formed on the active material layer in any one of the sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. This way, an all-solid state secondary battery can be manufactured.

As still another method, for example, the following method can be used. That is, the positive electrode sheet for an all-solid state secondary battery and the negative electrode sheet for an all-solid state secondary battery are prepared as described above. In addition, separately from the electrode sheets, the solid electrolyte composition is applied to a substrate to prepare a solid electrolyte sheet for an all-solid state secondary battery including the solid electrolyte layer. Furthermore, the positive electrode sheet for an all-solid state secondary battery and the negative electrode sheet for an all-solid state secondary battery are laminated such that the solid electrolyte layer removed from the substrate is sandwiched therebetween. This way, an all-solid state secondary battery can be manufactured.

In the above-described manufacturing method, the solid electrolyte composition according to the embodiment of the present invention may be used as any one of the positive electrode layer composition, the solid electrolyte composition, or the negative electrode layer composition, and is preferably used as all of the compositions.

The solid electrolyte layer or the like can also be formed on the substrate or the active material layer, for example, by pressure-molding the solid electrolyte composition or the like under a compression condition described below.

<Formation of Respective Layers (Film Formation)>

The method for applying the solid electrolyte composition is not particularly limited and can be appropriately selected. Examples thereof include coating (preferably wet-type coating), spray coating, spin coating, dip coating, slit coating, stripe coating, and bar coating.

In this case, the solid electrolyte composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (applied and dried layer). In addition, the temperature is not excessively increased, and the respective members of the all-solid state secondary battery are not impaired, which is preferable. Therefore, in the all-solid state secondary battery, excellent total performance can be exhibited, and excellent binding properties and excellent ion conductivity can be obtained even under no pressure.

As described above, in a case where the solid electrolyte composition according to the embodiment of the present invention is applied and dried, an applied and dried layer in which solid particles are strongly bound, and the interface resistance between the solid particles is low can be formed.

After the application of the solid electrolyte composition or after the preparation of the all-solid state secondary battery, the respective layers or the all-solid state secondary battery is preferably compressed. In addition, the respective layers are also preferably compressed in a state where they are laminated. Examples of the compression method include a method using a hydraulic cylinder press machine. The pressure is not particularly limited, but is, generally, preferably in a range of 5 to 1,500 MPa.

In addition, the applied solid electrolyte composition may be heated while being compressed. The heating temperature is not particularly limited, but is generally in a range of 30° C. to 300° C. The respective layers or the all-solid state secondary battery can also be pressed at a temperature higher than the glass transition temperature of the inorganic solid electrolyte. On the other hand, in a case where the inorganic solid electrolyte and the branched polymer are present together, the respective layers or the all-solid state secondary battery can also be pressed at a temperature higher than the glass transition temperature of the branched polymer. In general, the pressing temperature does not exceed the melting point of the above-described branched polymer represented by Formula 1.

The compression may be carried out in a state in which a coating solvent or the dispersion medium has been dried in advance or in a state in which the solvent or the dispersion medium remains.

The respective compositions may be applied at the same time, and the application, the drying, and the pressing may be carried out simultaneously and/or sequentially. The respective compositions may be applied to separate substrates and then laminated by transfer.

The atmosphere during the compression is not particularly limited and may be any one of in the atmosphere, under the dried air (the dew point: −20° C. or lower), in an inert gas (for example, in an argon gas, in a helium gas, or in a nitrogen gas), or the like.

The pressing time may be a short time (for example, within several hours) at a high pressure or a long time (one day or longer) at an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be homogeneous or variable with respect to a pressed portion such as a sheet surface.

The pressing pressure may be variable depending on the area or the thickness of the pressed portion. In addition, the pressure may also be variable stepwise for the same portion.

A pressing surface may be smooth or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of All-Solid State Secondary Battery]

The all-solid state secondary battery according to the embodiment of the present invention can be applied to a variety of usages. Application aspects are not particularly limited, and, in the case of being mounted in electronic apparatuses, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, and backup power supplies. In addition, examples of an electronic apparatus for consumer use include an automobile, an electromotive vehicle, a motor, a lighting device, a toy, a game device, a load conditioner, a timepiece, a strobe, a camera, a medical device (for example, a pacemaker, a hearing aid, or a shoulder massager). Further, the all-solid state secondary battery can be used as various cells for use in military or aerospace applications. In addition, the all-solid state secondary battery can also be combined with solar batteries.

EXAMPLES

Hereinafter, the present invention will be described in more detail based on Examples but is not limited to these examples. "Parts" and "%" that represent compositions in the following examples are mass-based unless particularly otherwise described. In the present invention, "room temperature" refers to 25° C.

1. Synthesis of Polymer Used in Examples and Comparative Examples

Polymers D-01 to D-27 and cD-01 to cD-04 used in the examples will be described below. The polymers D-20 to D-23 is the same as the polymer D-03 except that the mass average molecular weights are different. Therefore, chemical formulae of the polymers will not be shown. In addition, in the polymers D-13 to D-17, Numerical values added to the lower right side of each of the components forming the partial structure (polyacrylate chain) including $A^1$ and to the lower right side of each of the components forming the polymer chain $P^C$ represent a mass ratio between the partial structure including $A^1$ and the polymer chain $P^C$. In the polymers D-24 to D-27, numerical values added to the lower right sides of the respective components forming the polymer chain $P^C$ represent a mass ratio in the polymer chain $P^C$. In the respective formulae, Et represents ethyl, and Bn represents benzyl.

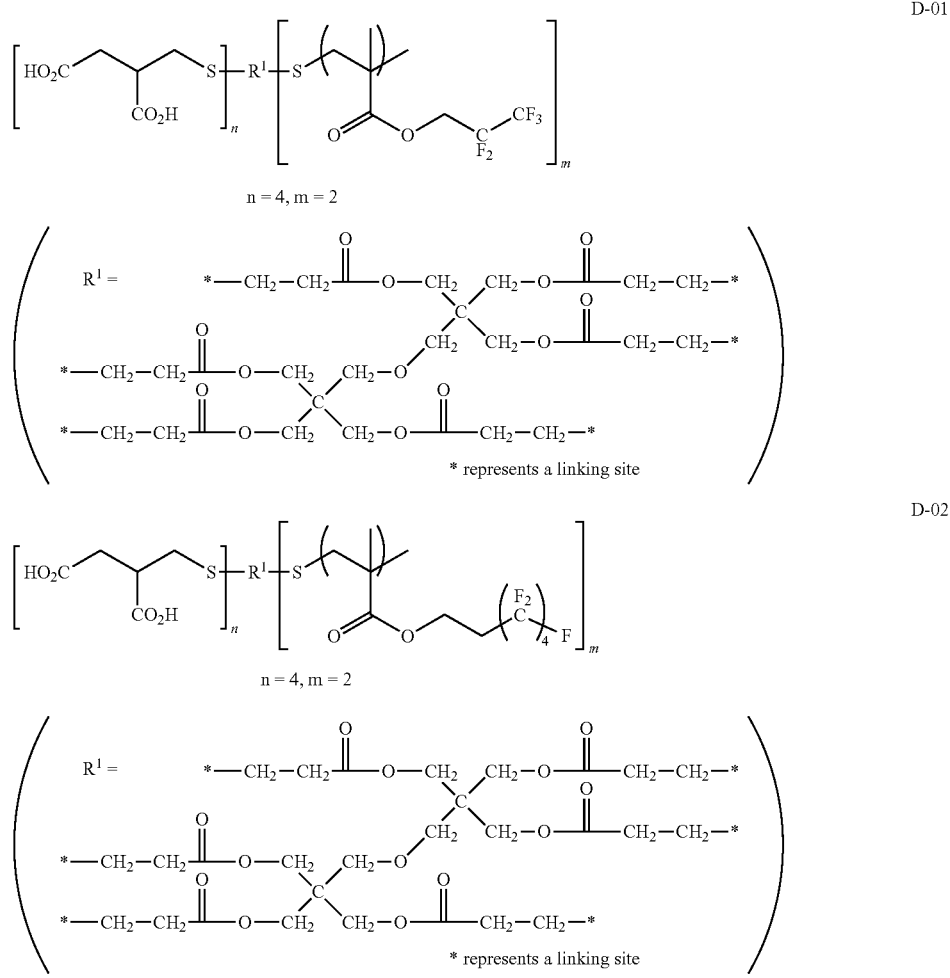

D-03
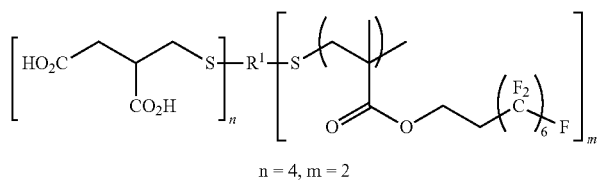
n = 4, m = 2
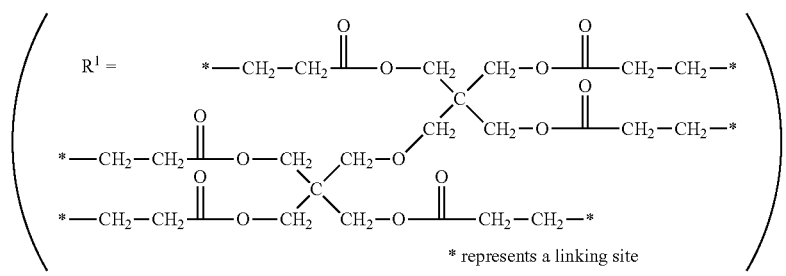
D-04
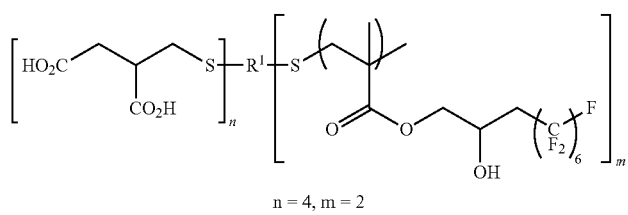
n = 4, m = 2
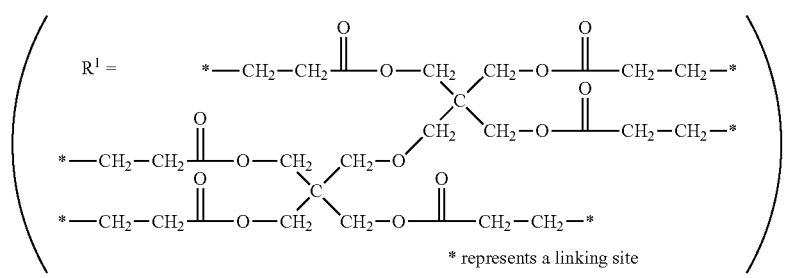
D-05
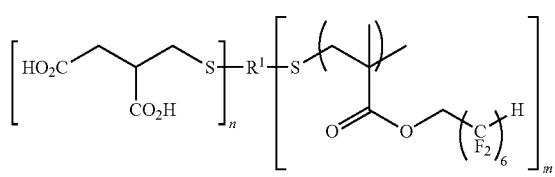
n = 4, m = 2
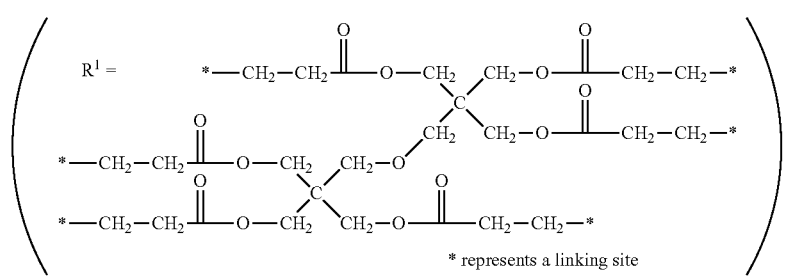

D-06
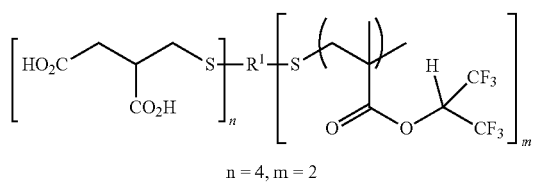
n = 4, m = 2
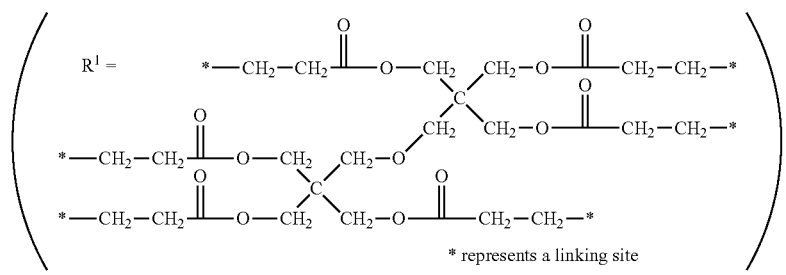
D-07
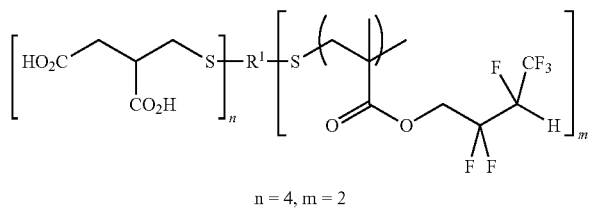
n = 4, m = 2
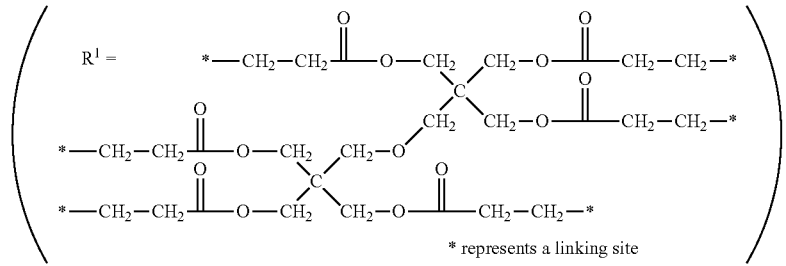
D-08
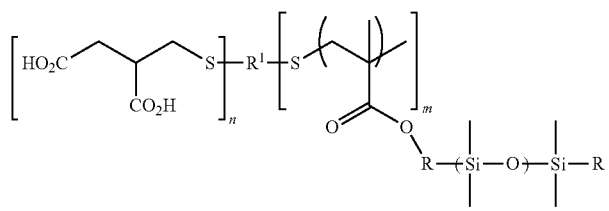
n = 4, m = 2
Trade Name X-22-174ASX
manufactured by Shin-Etsu Chemical
Co., Ltd., Molecular Weight: 900
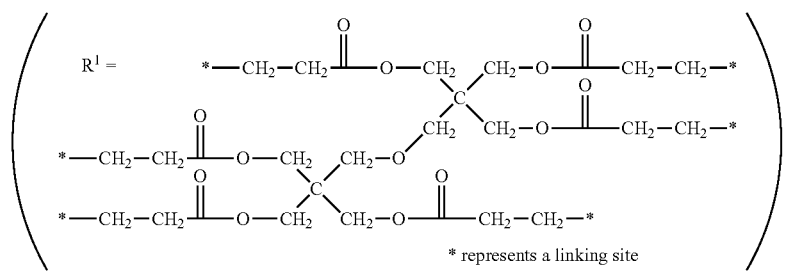

D-09
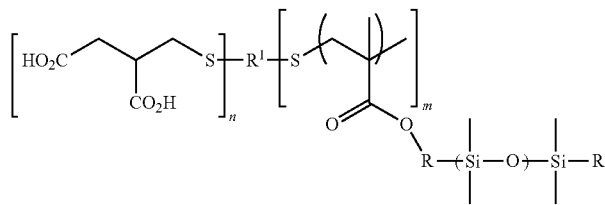
n = 4, m = 2
Trade Name KF-2012
manufactured by Shin-Etsu Chemical
Co., Ltd., Molecular Weight: 4600
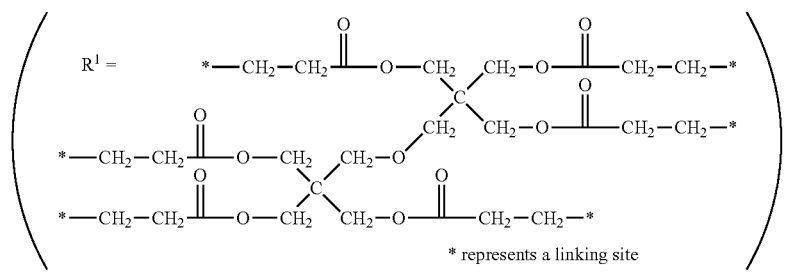
D-10
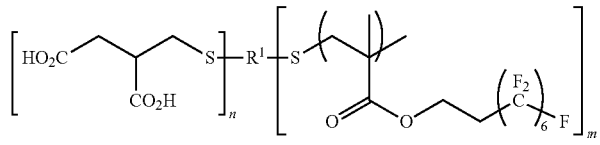
n = 3, m = 1
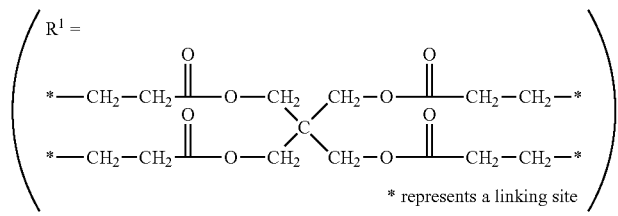
D-11
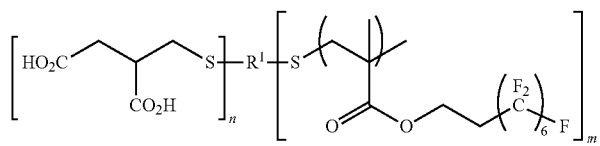
n = 2, m = 1
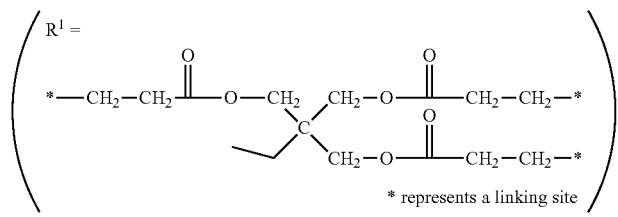

-continued
D-12
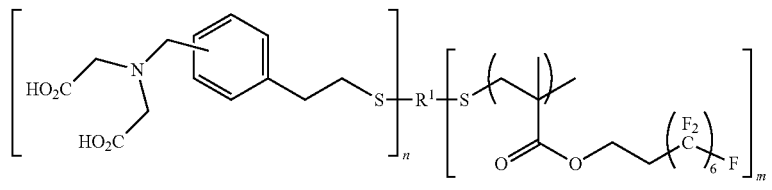
n = 4, m = 2
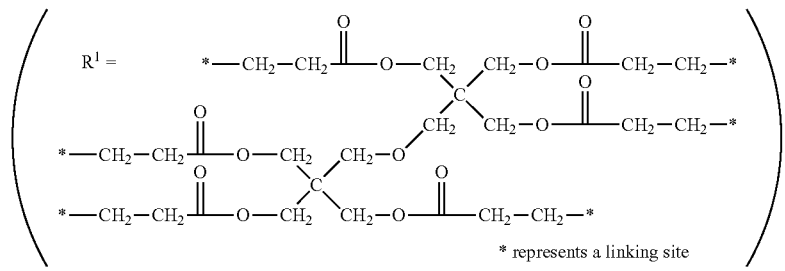
D-13
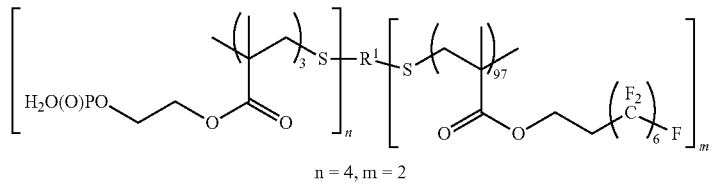
n = 4, m = 2
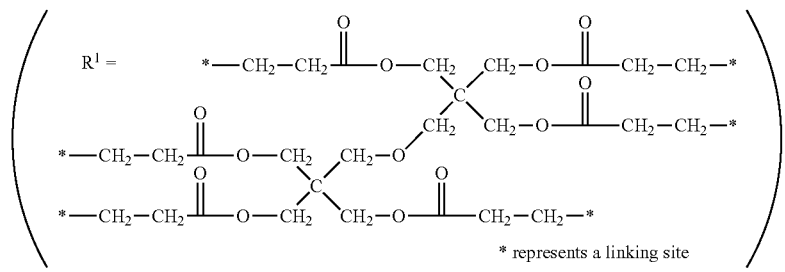
D-14
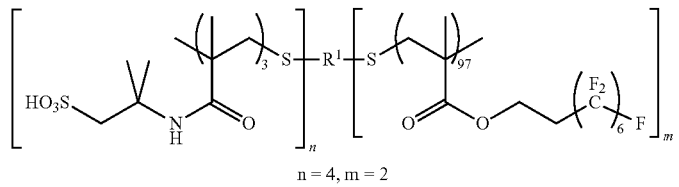
n = 4, m = 2
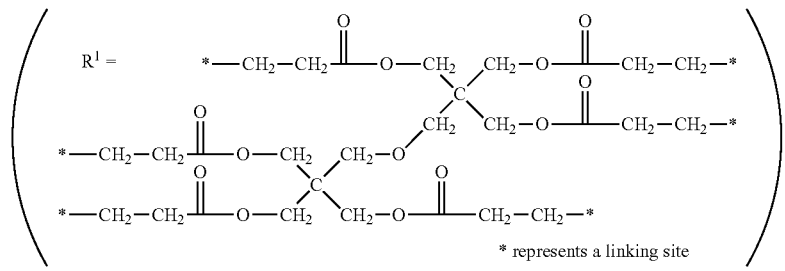

D-15
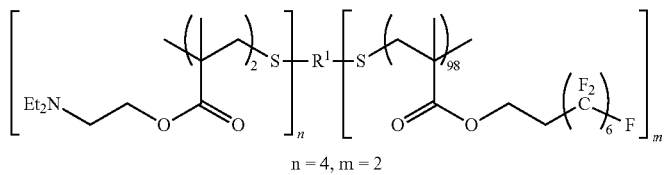
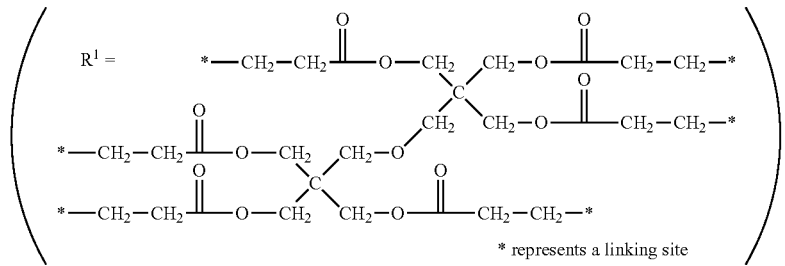
D-16
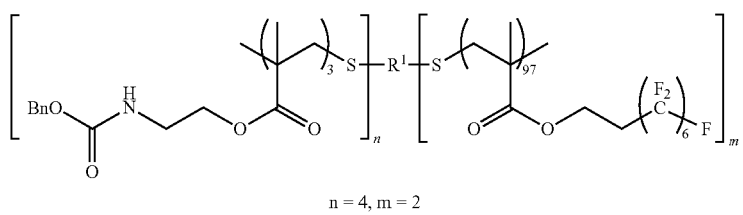
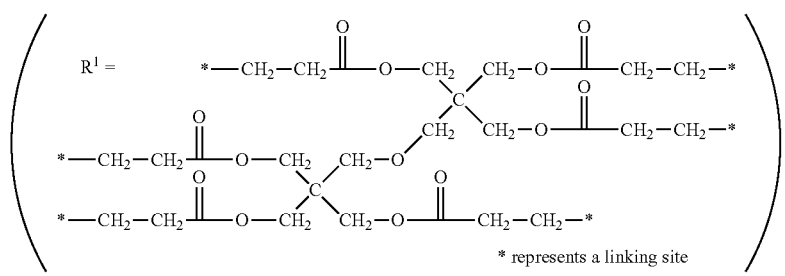
D-17
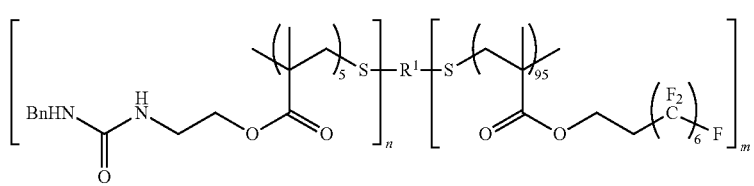
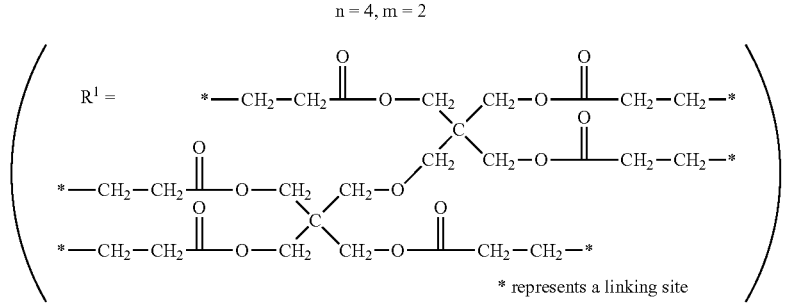

D-18
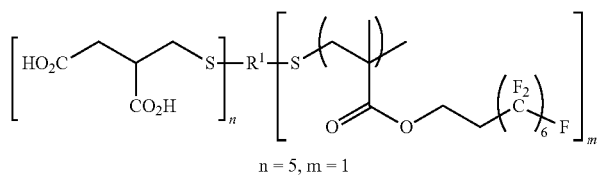
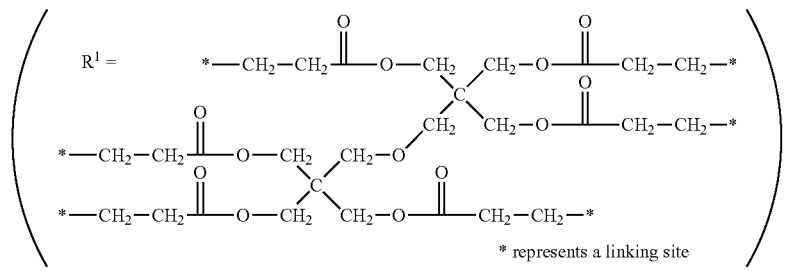
D-19
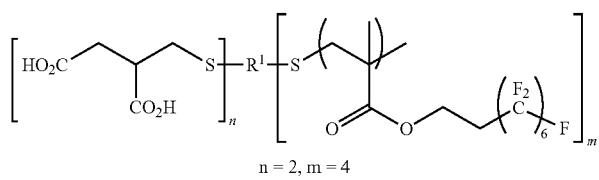
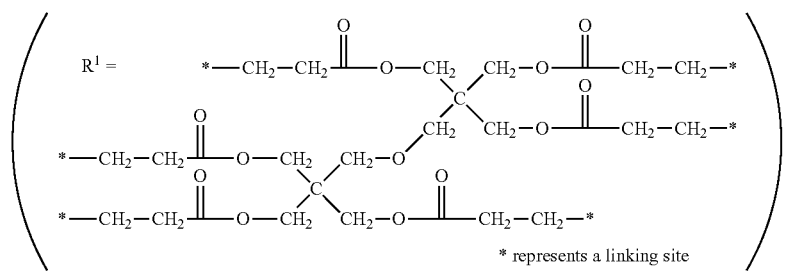
D-24
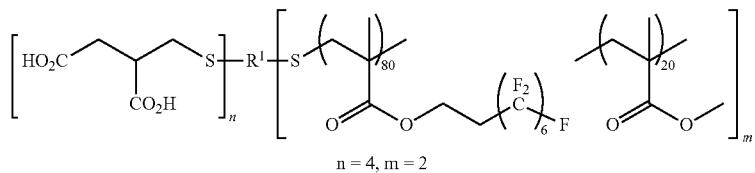
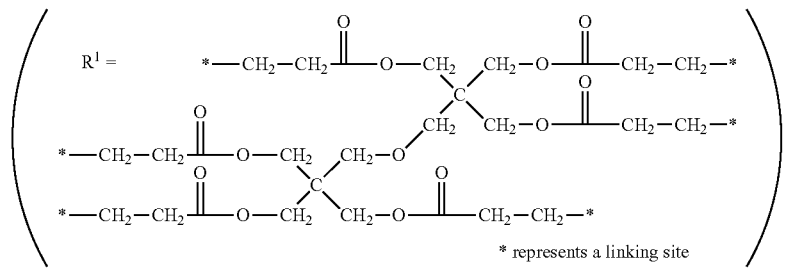

D-25
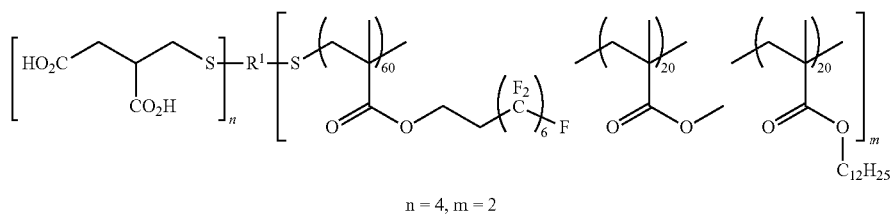
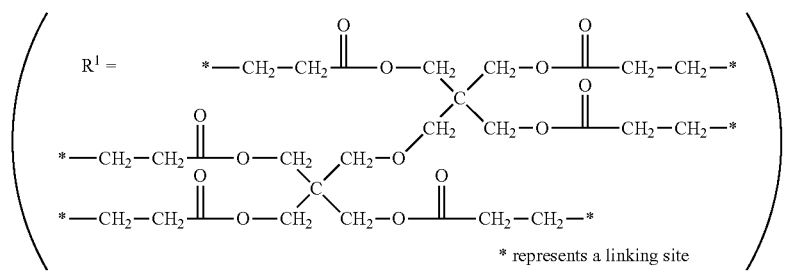
D-26
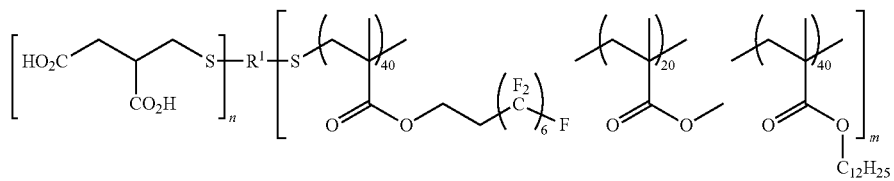
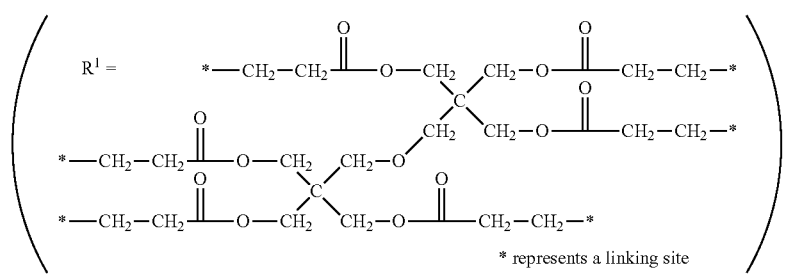
D-27
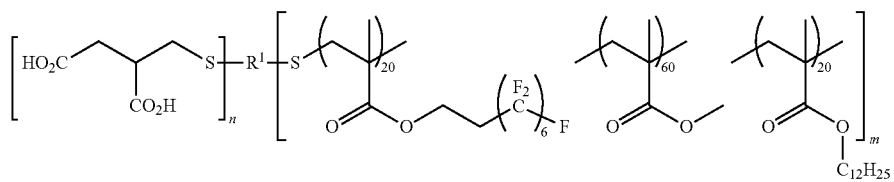
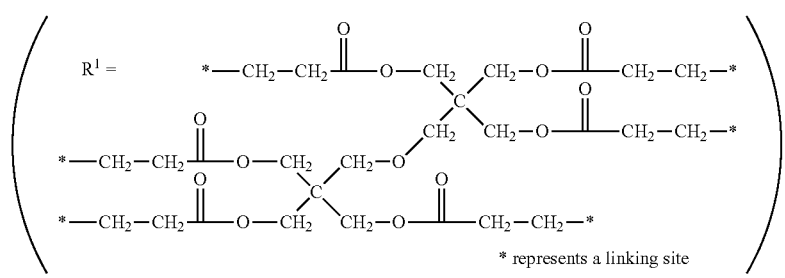
cD-01
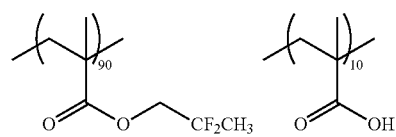

-continued
cD-02
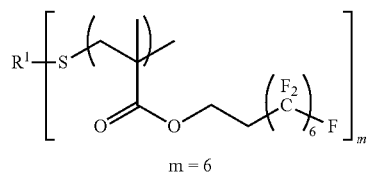
m = 6
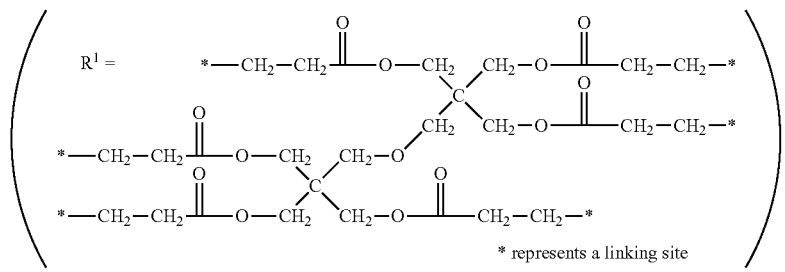
* represents a linking site
cD-03
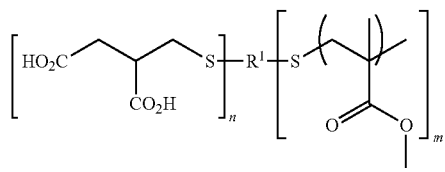
n = 4, m = 2
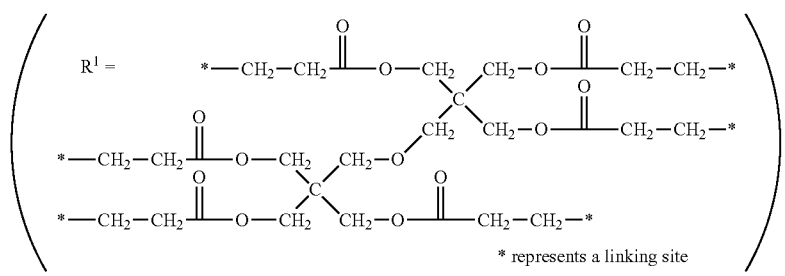
* represents a linking site
cD-04
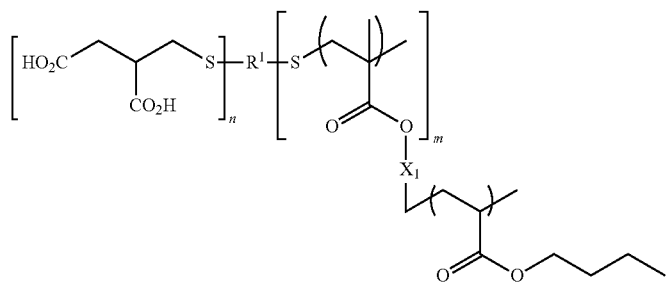
n = 4, m = 2
X represents a divalent linking group.
AB-6 manufactured by Toagosei Co., Ltd. is used
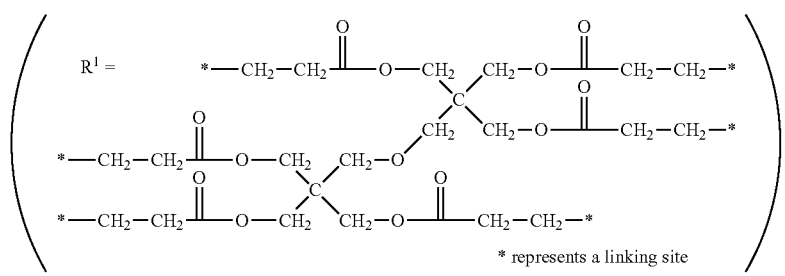
* represents a linking site

Synthesis Example 1: Preparation of Polymer D-01

First, the partial structure (—S—$R^2$-($A^1$)p) in Formula 1 was introduced into dipentaerythritol hexakis(3-mercaptoproponate). That is, dipentaerythritol hexakis(3-mercaptopropionate) (10.0 g), 1-methoxy-2-propanol (38.7 g), and Itaconic acid (6.6 g) were charged into a 100 mL three-neck flask equipped with a stirrer, a thermometer, a reflux cooling pipe, and a nitrogen gas introduction pipe and were heated to 80° C. in a nitrogen stream. Next, V-601 (0.03 g, an azo-based polymerization initiator, manufactured by Wako Pure Chemical Industries, Ltd.) was added to the three-neck flask, and the solution was stirred for 2 hours. As a result, the reaction solution was obtained.

The polymer D-01 was prepared using the obtained solution. That is, propylene glycol monomethyl ether acetate (100.0 g) was charged into a 1 L three-neck flask equipped with a stirrer, a thermometer, a reflux cooling pipe, and a nitrogen gas introduction pipe and was heated to 80° C. in a nitrogen stream. Next, a monomer solution consisting of 2,2,3,3,3-pentafluoropropyl methacrylate (150.0 g), the reaction solution (11.6 g), and V-601 (0.5 g), and propylene glycol monomethyl ether acetate (250.0 g) was added dropwise to the three-neck flask at a constant speed until the dropwise addition was completed after 3 hours. After completion of the dropwise addition of the monomer solution, the solution was stirred for 2 hours, propylene glycol monomethyl ether acetate (3.0 g) in which V-601 (0.3 g) was dissolved was added thereto, and the solution was heated to 90° C. and was further stirred for 2 hours. This solution was slowly added to 5 L of methanol, and the obtained solid was separated by filtration and cleaned with methanol. Next, 250 g of diisobutyl ketone was added to the solid, and the solution was stirred to dissolve the polymer. Methanol was removed from the obtained polymer solution under a reduced pressure, diisobutyl ketone was added to adjust the concentration of solid contents to 30 mass %, and the solution was filtered through a mesh having a pore size of 50 µm. This way, a polymer D-01 solution having a concentration of solid contents of 30 mass % was prepared.

Synthesis Examples 2 to 19: Synthesis of Polymers D-02 to D-19

Polymers D-02 to D-19 were synthesized using the same method as that of Synthesis Example 1, except that itaconic acid, dipentaerythritol hexakis(3-mercaptopropionate), and 2,2,3,3,3-pentafluoropropyl methacrylate were changed to the polymerizable compound that can form the partial structure including $A^2$ and $R^6$, the thiol compound derived from $R^1$ in Formula 1, and the polymerizable compound forming the polymer chain $P^C$ corresponding to the respective polymers D-02 to D-19 represented by Formulae and the amounts thereof used are optionally changed.

During the synthesis of each of the polymers D-08 and D-09, methacryl-modified silicone oil X-22-174ASX and KF-2012 (trade names, both of which are manufactured by Shin-Etsu Chemical Co., Ltd.) were used, respectively, as the polymerizable compound forming the polymer chain $P^C$.

Synthesis Examples 20 to 23: Synthesis of Polymers D-20 to D-23

Polymers D-20 to D-23 having a mass average molecular weight as shown in Table 1 were synthesized using the same method as that of Synthesis Example 3, except that a ratio between 2,2,3,3,3-pentafluoropropyl methacrylate and a reaction solution including dipentaerythritol hexakis(3-mercaptopropionate) was changed.

Synthesis Examples 24 to 27: Synthesis of Polymers D-24 to D-27

Polymers D-24 to D-27 were synthesized using the same method as that of Synthesis Example 1, except that the polymerizable compound forming the polymer chain $P^C$ was changed to the component corresponding to each of the polymers D-24 to D-27 represented by the formulae and the other component (methyl methacrylate or methyl methacrylate and lauryl methacrylate), and the amount thereof used was changed.

Comparative Synthesis Example 1: Synthesis of Polymer cD-01

Diisobutyl ketone (138.5 g) was charged into a 1 L three-neck flask equipped with a stirrer, a thermometer, a reflux cooling pipe, and a nitrogen gas introduction pipe and was heated to 80° C. in a nitrogen stream. Next, a monomer solution consisting of methacrylic acid (15.0 g), 2,2-difluoropropyl methacrylate (135.0 g), mercaptopropionic acid (0.4 g), diisobutyl ketone (95.5 g), and V-601 (0.3 g) was added dropwise to the three-neck flask at a constant speed until the dropwise addition was completed after 3 hours. After completion of the dropwise addition of the monomer solution, the solution was stirred for 2 hours, V-601 (0.3 g) and diisobutyl ketone (3.0 g) were added thereto, and the solution was heated to 90° C. and was further stirred for 2 hours. This solution was slowly added to 5 L of methanol, and the obtained solid was separated by filtration and cleaned with methanol. Next, 250 g of diisobutyl ketone was added to the solid, and the solution was stirred to dissolve the polymer. Methanol was removed from the obtained polymer solution under a reduced pressure, diisobutyl ketone was added to adjust the concentration of solid contents to 30 mass %, and the solution was filtered through a mesh having a pore size of 50 µm. This way, a polymer cD-01 solution having a concentration of solid contents of 30 mass % was prepared.

Comparative Synthesis Example 2: Synthesis of Polymer cD-02

A polymer cD-02 solution was synthesized using the same method as that of Synthesis Example 1, except that 2,2,3,3,3-pentafluoropropyl methacrylate was changed to 2-(perfluorohexyl)ethyl methacrylate and the reaction solution (11.6 g) including dipentaerythritol hexakis(3-mercaptopropionate) was changed to dipentaerythritol hexakis(3-mercaptopropionate) (1.2 g).

Comparative Synthesis Example 3: Synthesis of Polymer cD-03

A polymer cD-03 was synthesized using the same method as that of Synthesis Example 1, except that the polymerizable compound forming the polymer chain $P^C$ was changed to methyl methacrylate.

Comparative Synthesis Example 4: Synthesis of Polymer cD-04

A polymer cD-04 was synthesized using the same method as that of Synthesis Example 1, except that the polymerizable compound forming the polymer chain $P^C$ was changed to a macromonomer AB-6 (manufactured by Toagosei Co., Ltd.). The macromonomer AB-6 is polybutyl acrylate (number-average molecular weight: 6000) in which a terminal functional group is a methacryloyl group.

The mass average molecular weight of the each of the synthesized polymers was measured using the above-described method (condition 2), and the result thereof was shown in Table 1. The SP value of each of the components forming the polymer chain $P^C$ of each of the polymers was calculated based on the above-described method. The results are shown in Table 1. In a case where the polymer includes two or more components, the SP values of the respective components were shown together using "I".

2. Synthesis of Sulfide-Based Inorganic Solid Electrolyte

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, put into an agate mortar, and mixed using an agate muddler for five minutes. The mixing ratio between $Li_2S$ and $P_2S_5$ ($Li_2S:P_2S_5$) was set to 75:25 in terms of molar ratio.

66 g of zirconia beads having a diameter of 5 mm were put into a 45 mL zirconia container (manufactured by Fritsch Japan Co., Ltd.), the full amount of the mixture of the lithium sulfide and the diphosphoruspentasulfide was put thereinto, and the container was completely sealed in an argon atmosphere. The container was set in a planetary ball mill P-7 (trade name; manufactured by Fritsch Japan Co., Ltd.), mechanical milling was carried out at a temperature of 25° C. and a rotation speed of 510 rpm for 20 hours. As a result, 6.20 g of a yellow powder of a sulfide-based inorganic solid electrolyte (Li/P/S-based glass; hereinafter, referred to as LPS) was obtained.

Example 1

In Example 1, using a solid electrolyte composition prepared using the polymer D-01 solution, a sheet for an all-solid state secondary battery and an all-solid state secondary battery having a layer configuration shown in FIG. 1 were prepared, and the performance thereof was evaluated. The results are shown in Table 1.

<Preparation of Solid Electrolyte Composition D-01>

180 zirconia beads having a diameter of 5 mm were put into a 45 mL zirconia container (manufactured by Fritsch Japan Co., Ltd.), and 9.5 g of LPS synthesized as described above and 12.3 g of butyl butyrate as a dispersion medium were put thereinto. Next, 0.5 g (corresponding to the solid content) of the polymer D-01 solution was put into the container, and the container was set in a planetary ball mill P-7 (trade name, manufactured by Fritsch Japan Co., Ltd.). The components were continuously mixed at a temperature of 25° C. and a rotation speed of 300 rpm for 3 hours. As a result, a solid electrolyte composition D-01 was prepared.

<Preparation of Electrode Sheet D-01 for All-Solid State Secondary Battery>

180 zirconia beads having a diameter of 5 mm were put into a 45 mL zirconia container (manufactured by Fritsch Japan Co., Ltd.), and 1.9 g (corresponding to the solid content) of the solid electrolyte composition D-01 prepared as described above and 12.3 g of butyl butyrate as the total amount of the dispersion medium were put thereinto. Further, 8.0 g of $LiNi_{0.85}Co_{0.10}Al_{0.05}O_2$ (NCA) as a positive electrode active material and 0.1 g of acetylene black were put thereinto. Next, the container was continuously set in a planetary ball mill P-7 and the components were mixed together at a temperature of 25° C. and a rotation speed of 200 rpm for 20 minutes. This way, a positive electrode composition (slurry) D-01 was prepared.

The positive electrode composition D-01 prepared as described above was applied to an aluminum foil as a current collector having a thickness of 20 μm using a Baker Type applicator (trade name: SA-201, manufactured by Tester Sangyo Co., Ltd.), and was heated at 80° C. for 1 hour and further heated at 110° C. for 1 hour to dry the positive electrode composition D-01. Next, the dried positive electrode layer composition D-01 was compressed (20 MPa, 1 minute) while being heated (120° C.) using a heat press machine. As a result, a positive electrode sheet D-01 for an all-solid state secondary battery having a laminate structure of positive electrode active material layer having a thickness of 60 μm/aluminum foil was prepared.

<Preparation of Negative Electrode Sheet D-01 for All-Solid State Secondary Battery>

Next, 180 zirconia beads having a diameter of 5 mm were put into a 45 mL zirconia container (manufactured by Fritsch Japan Co., Ltd.), and 5.0 g (corresponding to the solid content) of the solid electrolyte composition D-01 prepared as described above and 12.3 g of butyl butyrate as the dispersion medium were put thereinto. Next, the container was set in a planetary ball mill P-7 (trade name, manufactured by Fritsch Japan Co., Ltd.), and the components were stirred for 3 hours at a temperature of 25° C. and a rotation speed of 300 rpm. Next, 5.0 g of graphite as a negative electrode active material was put into the container, the container was set in a planetary ball mill P-7 again, and the components were continuously mixed at a temperature of 25° C. and a rotation speed of 100 rpm for 15 minutes. This way, a negative electrode layer composition (slurry) D-01 was obtained.

The negative electrode layer composition D-01 obtained as described above was applied to a stainless steel foil having a thickness of 10 μm using the Baker Type applicator and was heated at 80° C. for 2 hours to dry the negative electrode layer composition D-01. Next, the dried negative electrode layer composition D-01 was compressed (600 MPa, 1 minute) while being heated (120° C.) using a heat press machine. As a result, a negative electrode sheet D-01 for an all-solid state secondary battery having a laminate structure of negative electrode active material layer having a thickness of 120 μm/stainless steel foil was prepared.

<Manufacturing of All-solid State Secondary Battery D-01>

Next, the prepared solid electrolyte composition D-01 was applied to the negative electrode active material layer of the prepared negative electrode sheet D-01 for an all-solid state secondary battery using the Baker Type applicator, was heated at 80° C. for 1 hour and further heated at 110° C. for 6 hours to dry the solid electrolyte composition D-01. Next, the negative electrode sheet D-01 in which the solid electrolyte layer (applied and dried layer) was formed on the negative electrode active material layer was compressed (30

MPa, 1 minute) while being heated (120° C.) using a heat press machine. As a result, the negative electrode sheet D-01 having a laminate structure of solid electrolyte layer having a thickness of 60 μm/negative electrode active material layer/stainless steel foil was prepared.

This negative electrode sheet was cut in a circular plate shape having a diameter of 15 mm. On the other hand, the positive electrode sheet D-01 for an all-solid state secondary battery prepared as described above was cut in a circular plate shape having a diameter of 13 mm. The positive electrode active material layer in the positive electrode sheet D-01 for an all-solid state secondary battery and the solid electrolyte layer formed on the negative electrode sheet D-01 were disposed (laminated) to face each other. Next, the sheet was compressed (40 MPa, 1 minute) while being heated (120° C.) using a heat press machine. As a result, a laminate for an all-solid state secondary battery having a laminate structure of aluminum foil/positive electrode active material layer (thickness: 58 μm)/solid electrolyte layer/ negative electrode active material layer/stainless steel foil was prepared.

Figure 2:
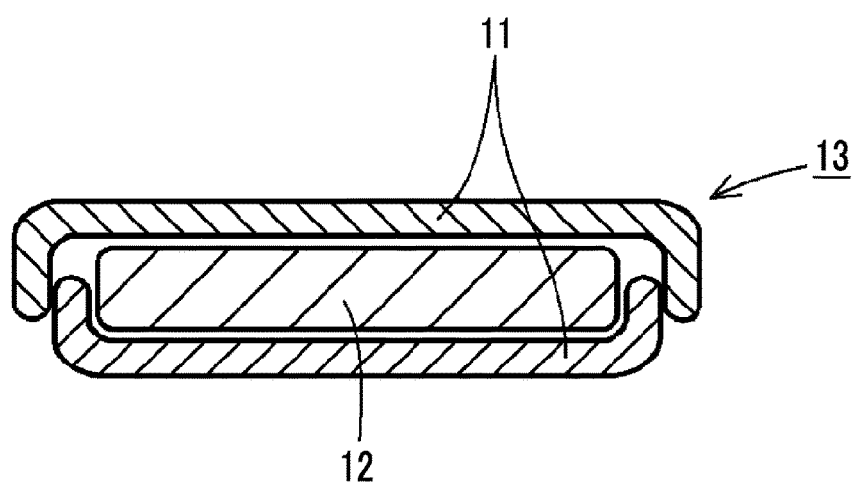
FIG. 2 is a vertical cross-sectional view schematically illustrating an all-solid state secondary battery (coin battery) prepared in Examples.

Next, a laminate 12 for an all-solid state secondary battery prepared as described above was put into a 2032-type coin case 11 formed of stainless steel equipped with a spacer and a washer (not shown in FIG. 2), and the 2032-type coin case 11 was swaged. As a result, an all-solid state secondary battery D-01 represented by reference numeral 13 in FIG. 2 was prepared.

Examples 2 to 27 and Comparative Examples 1 to 4

An electrode sheet for an all-solid state secondary battery and a negative electrode sheet for an all-solid state secondary battery were prepared using the same method as that of Example 1, except that each of the compositions prepared using the polymer shown in Table 1 was used during the preparation of the solid electrolyte composition D-01, the preparation of the electrode sheet D-01 for an all-solid state secondary battery, the preparation of the negative electrode sheet D-01 for an all-solid state secondary battery, and the manufacturing of the all-solid state secondary battery D-01. Next, an all-solid state secondary battery was manufactured.
<Test of Dispersibility of Solid Electrolyte Composition>

A part of each of the solid electrolyte compositions prepared as described above was separated from the planetary ball mill P-7, and a transparent glass tube having a diameter of 10 mm was charged with the separated composition up to a height of 3 cm. The glass tube was left to stand at 25° C. for 48 hours. Next, the phase separation state of the composition and the degree of phase separation were determined based on the following evaluation standards. In this test, an evaluation standard of "C" or higher is an acceptable level.
Evaluation Standards A: layer separation did not occur in the composition (slurry)

B: a portion (interface with a supernatant layer) where layer separation (phase separation) occurred was at a distance of less than 2 mm from the liquid level C: a portion where layer separation occurred was at a distance of 2 mm or more and less than 5 mm from the liquid level D: a portion where layer separation occurred was at a distance of 5 mm or more and less than 10 mm from the liquid level E: a portion where layer separation occurred was at a distance of 10 mm or more and less than 20 mm from the liquid level F: a portion where layer separation occurred was at a distance of 20 mm or more from the liquid level
<Test for Binding Properties of Electrode Sheet for All-Solid State Secondary Battery>

As a test for binding properties of the positive electrode sheet for an all-solid state secondary battery, a bending resistance test using a mandrel tester (according to JIS K5600-5-1) was performed for evaluation. Specifically, a strip-shaped specimen having a width of 50 mm and a length of 100 mm was cut out from each of the sheets. This specimen was set such that the active material layer surface was opposite to the mandrel (the current collector faced mandrel side) and the width direction of the specimen was parallel to the axis of the mandrel. Next, the specimen was bent by 180° (once) along the outer circumferential surface of the mandrel, and whether or not cracking or fracturing occurred in the active material layer was observed. The bending test was performed using a mandrel having a diameter of 32 mm. In a case where cracking and fracturing did not occur, the diameter of the mandrel (unit mm) was gradually reduced to 25, 20, 16, 12, 10, 8, 6, 5, 3, and 2, and the diameter of the mandrel at which cracking and/or fracturing occurred was recorded. Binding properties were evaluated based on one of the following evaluation standards in which the diameter (defect occurrence diameter) at which cracking or fracturing initially occurred was included. In the present invention, as the defect occurrence diameter decreases, the binding properties of the solid particles become stronger, and an evaluation standard "C" or higher is an acceptable level.

Evaluation Standards

A: 3 mm or less

B: 5 mm or 6 mm

C: 8 mm

D: 10 mm

E: 12 mm or more (Measurement of Battery Performance (Discharge Capacity))

The discharge capacity was measured as the battery performance using an all-solid state secondary battery prepared using the same method as that of <Manufacturing of All-Solid State Secondary Battery D-01> described above, except that the positive electrode sheet prepared as described below was used.

That is, 180 zirconia beads having a diameter of 5 mm were put into a 45 mL zirconia container (manufactured by Fritsch Japan Co., Ltd.), and 1.9 g (corresponding to the solid content) of the solid electrolyte composition D-01 prepared as described above and 12.3 g of butyl butyrate as the total amount of the dispersion medium were put thereinto. Further, 8.0 g of $LiNi_{0.85}Co_{0.10}Al_{0.05}O_2$(NCA) as a positive electrode active material and 0.1 g of acetylene black were put thereinto. Next, the container was continuously set in a planetary ball mill P-7 and the components were mixed together at a temperature of 25° C. and a rotation speed of 200 rpm for 20 minutes. This way, a positive electrode composition (slurry) D-01A for capacity measurement was prepared.

Next, the positive electrode composition D-01A prepared as described above was left to stand at 25° C. for 2 hours, was applied to an aluminum foil as a current collector having a thickness of 20 μm using a Baker Type applicator (trade name: SA-201, manufactured by Tester Sangyo Co., Ltd.), and was heated at 80° C. for 1 hour and further heated at 110° C. for 1 hour to dry the positive electrode composition D-01A. Next, the dried positive electrode layer composition D-01A was compressed (20 MPa, 1 minute) while being heated (120° C.) using a heat press machine. As a result, a positive electrode sheet D-01A for capacity measurement of an all-solid state secondary battery having a laminate structure of positive electrode active material layer having a thickness of 60 μm/aluminum foil was prepared.

value was set as the discharge capacity of the all-solid state secondary battery and was determined based on the following evaluation standards. In this test, an evaluation standard of "C" or higher is an acceptable level.

Evaluation Standards

A: the discharge capacity was 200 mAh or higher

B: the discharge capacity was 170 mAh or higher and lower than 200 mAh

C: the discharge capacity was 140 mAh or higher and lower than 170 mAh

D: the discharge capacity was 110 mAh or higher and lower than 140 mAh

E: the discharge capacity was 70 mAh or higher and lower than 110 mAh

F: the discharge capacity was lower than 70 mAh

TABLE 1

| | | Polymer | | Evaluation Result | | |
|---|---|---|---|---|---|---|
| | No. | Mass Average Molecular Weight | SP Value of Component | Dispersibility (Dispersion Liquid) | Binding Properties | Battery Characteristics |
| Example 1 | D-01 | 32000 | 15.3 | A | B | A |
| Example 2 | D-02 | 18000 | 14.2 | A | B | A |
| Example 3 | D-03 | 15000 | 13.4 | A | A | A |
| Example 4 | D-04 | 22000 | 14.7 | A | A | B |
| Example 5 | D-05 | 28000 | 13.5 | A | A | B |
| Example 6 | D-06 | 16000 | 14.8 | A | A | A |
| Example 7 | D-07 | 21000 | 14.9 | A | A | A |
| Example 8 | D-08 | 18000 | 15.8 | A | A | B |
| Example 9 | D-09 | 35000 | 16.2 | A | A | A |
| Example 10 | D-10 | 16000 | 13.4 | B | A | B |
| Example 11 | D-11 | 12000 | 13.4 | C | B | C |
| Example 12 | D-12 | 20000 | 13.4 | A | A | A |
| Example 13 | D-13 | 24000 | 13.4 | A | A | A |
| Example 14 | D-14 | 16000 | 13.4 | A | A | A |
| Example 15 | D-15 | 18000 | 13.4 | B | A | B |
| Example 16 | D-16 | 22000 | 13.4 | B | A | B |
| Example 17 | D-17 | 28000 | 134 | B | A | B |
| Example 18 | D-18 | 12000 | 13.4 | B | A | B |
| Example 19 | D-19 | 34000 | 13.4 | B | A | B |
| Example 20 | D-20 | 8000 | 13.4 | C | B | C |
| Example 21 | D-21 | 10000 | 13.4 | B | B | A |
| Example 22 | D-22 | 35000 | 13.4 | A | A | A |
| Example 23 | D-23 | 50000 | 13.4 | B | A | B |
| Example 24 | D-24 | 18000 | 13.4/19.5 | A | A | A |
| Example 25 | D-25 | 22000 | 13.4/19.5/17.4 | B | B | B |
| Example 26 | D-26 | 25000 | 13.4/19.5/17.4 | B | C | C |
| Example 27 | D-27 | 13000 | 13.4/19.5/17.4 | C | C | C |
| Comparative Example 1 | cD-01 | 22000 | 15.3/24.0 | E | D | E |
| Comparative Example 2 | cD-02 | 30000 | 13.4 | D | C | D |
| Comparative Example 3 | cD-03 | 18000 | 19.5 | D | E | F |
| Comparative Example 4 | cD-04 | 18000 | 18.0 | D | C | D |

The discharge capacity of each of the all-solid state secondary batteries using the positive electrode sheet D-01A for an all-solid state secondary battery manufactured as described above was measured using a charging and discharging evaluation device "TOSCAT-3000" (trade name; manufactured by Toyo System Corporation). The all-solid state secondary battery was charged at a current value of 0.2 mA until the battery voltage reached 4.2 V, and then was discharged at a current value of 0.2 mA until the battery voltage reached 3.0 V. This charging and discharging operation was set as one cycle and was repeated. During this charging and discharging cycle, the discharge capacity of the third cycle was obtained. This discharge capacity was converted into a value per 100 cm² of the surface area of the positive electrode active material layer, and this converted The following can be seen from the results of Table 1.

That is, In Comparative Examples 1 and 2 where the branched polymer not including the partial structure including the group $A^1$ and the inorganic solid electrolyte were used in combination although the component having a fluoroalkylene group was provided or the component having a linear polymer or a fluoroalkylene group was provided, the dispersibility of the solid electrolyte composition was not sufficient, and the all-solid state secondary battery did not also exhibit sufficient battery performance. Further, in Comparative Example 1, the binding properties were also poor. In addition, in Comparative Example 3 in which the branched polymer not including the component having a fluoroalkylene group or a siloxane structure was used in combination with the inorganic solid electrolyte although the partial structure including the group $A^1$ was provided, the binding properties of the solid particles in the sheet for an all-solid state secondary battery was weak, and the dispersibility of the solid electrolyte composition and the battery performance of the all-solid state secondary battery were not sufficient. Further, in Comparative Example 4 in which the branched polymer including the component derived from a macromonomer in the polymer chain $P^C$ was used in combination with the inorganic solid electrolyte, the dispersibility of the solid electrolyte composition was poor, and the battery performance of the all-solid state secondary battery were not sufficient.

On the other hand, in the solid electrolyte compositions according to Examples 1 to 27 in which the polymer represented by Formula 1 was used in combination with the inorganic solid electrolyte, the solid particles were highly dispersed, and excellent dispersibility was exhibited. In addition, in a sheet for an all-solid state secondary battery prepared using each of the solid electrolyte compositions, the solid particles can strongly bind to each other (the binding properties of the solid particles are excellent). In an all-solid state secondary battery including the sheet for an all-solid state secondary battery as a constituent layer, high battery performance (discharge capacity) is exhibited.

The present invention has been described using the embodiments. However, unless specified otherwise, any of the details of the above description is not intended to limit the present invention and can be construed in a broad sense within a range not departing from the concept and scope of the present invention disclosed in the accompanying claims.

The present application claims priority based on JP2018-182796 filed on Sep. 27, 2018, the entire content of which is incorporated herein by reference.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery
11: coin case
12: laminate for all-solid state secondary battery
13: all-solid state secondary battery (coin battery)

What is claimed is:

1. A solid electrolyte composition comprising:
an inorganic solid electrolyte having ion conductivity of a metal belonging to Group 1 or Group 2 in the periodic table; and
a polymer represented by Formula 1,

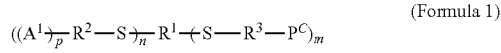
(Formula 1)

in the formula, $R^1$ represents an (m+n)-valent linking group,
$A^1$ represents an acidic group, a group having a basic nitrogen atom, a urea group, a urethane group, an alkoxysilyl group, an epoxy group, an isocyanate group, or a hydroxyl group, p represents an integer of 1 to 10,
$R^2$ and $R^3$ represent a single bond or a linking group,
$P^C$ represents a polymer chain that includes a component represented by Formula (4),
m represents an integer of 1 to 8,
n represents an integer of 2 to 9, and
m+n represents an integer of 3 to 10,

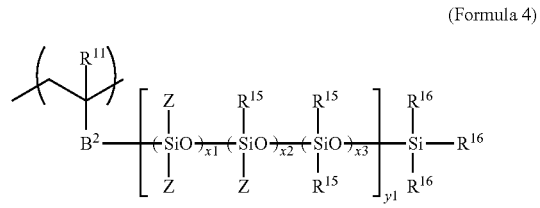
(Formula 4)

in Formula (4), $R^{11}$ represents a hydrogen atom or methyl,
$B^2$ represents a linking group,
$R^{15}$ and $R^{16}$ represent an alkyl group or an aryl group,
x1, x2, and x3 represent an integer of 0 or more,
a sum of x1, x2, and x3 is an integer of 1 to 100,
y1 represents an integer of 1 to 30, and
Z represents a group represented by Formula (Z), and

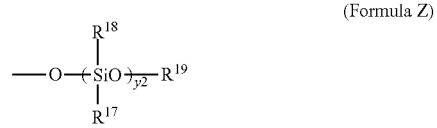
(Formula Z)

in Formula (Z), $R^{17}$ and $R^{18}$ represent an alkyl group or an aryl group,
$R^{19}$ represents an unsubstituted alkyl group having 1 to 4 carbon atoms, and
y2 represents an integer of 1 to 100.

2. The solid electrolyte composition according to claim 1, wherein the component represented by Formula (4) a component derived from a polymerizable compound having one or more ethylenically unsaturated group.

3. The solid electrolyte composition according to claim 1, wherein the polymer chain $P^C$ is a polymer chain of a polymerizable compound selected from (meth)acrylic acid, a (meth)acrylic acid ester compound, or a (meth)acrylonitrile compound.

4. The solid electrolyte composition according to claim 1, wherein the polymer is a reactant of a compound represented by Formula 2 and a polymerizable compound forming the polymer chain $P^C$,

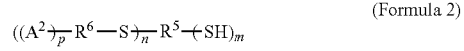
(Formula 2)

in the formula, $R^5$ represents an (m+n)-valent linking group,
$R^6$ represents a single bond or a linking group,
$A^2$ represents an acidic group, a group having a basic nitrogen atom, a urea group, a urethane group, an alkoxysilyl group, an epoxy group, an isocyanate group, or a hydroxyl group, p represents an integer of 1 to 10,
m represents an integer of 1 to 8,
n represents an integer of 2 to 9, and
m+n represents an integer of 3 to 10.

5. The solid electrolyte composition according to claim 1, wherein the inorganic solid electrolyte is represented by Formula (1), $$L_{a1}M_{b1}P_{c1}S_{d1}A_{e1} \quad (1)$$

in the formula, L represents an element selected from Li, Na, or K, M represents an element selected from B, Zn, Sn, Si, Cu, Ga, Sb, Al, or Ge, A represents an element selected from I, Br, Cl, or F, and a1 to e1 represent compositional ratios between the respective elements, and a1:b1:c1:d1:e1 satisfies 1 to 12:0 to 5:1:2 to 12:0 to 10.

6. The solid electrolyte composition according to claim 1, further comprising a dispersion medium.

7. The solid electrolyte composition according to claim 6, wherein the dispersion medium is selected from a ketone compound, an aliphatic compound, or an ester compound.

8. The solid electrolyte composition according to claim 1, further comprising an active material.

9. A sheet for an all-solid state secondary battery, the sheet comprising a layer that is formed of the solid electrolyte composition according to claim 1.

10. An electrode sheet for an all-solid state secondary battery, the electrode sheet comprising:
    an active material layer formed of the solid electrolyte composition according to claim 8.

11. An all-solid state secondary battery comprising a positive electrode active material layer, a solid electrolyte layer, and a negative electrode active material layer in this order,
    wherein at least one of the positive electrode active material layer, the solid electrolyte layer, or the negative electrode active material layer is formed of the solid electrolyte composition according to claim 1.

12. A method of manufacturing a sheet for an all-solid state secondary battery, the method comprising forming a film using the solid electrolyte composition according to claim 1.

13. A method of manufacturing an all-solid state secondary battery, the method comprising manufacturing the all-solid state secondary battery through the method according to claim 12.

* * * * *